(12) United States Patent
Campbell et al.

(10) Patent No.: US 6,190,090 B1
(45) Date of Patent: Feb. 20, 2001

(54) APPARATUS FOR USE IN A PIPELINE

(75) Inventors: Douglas Clinton Campbell, deceased, late of Sherwood Park; by Charles Robert Knights, executor, Thorsby; Brian Varney, Alberta, all of (CA)

(73) Assignee: Tuboscope Pipeline Services Canada, Inc., Alberta (CA)

( * ) Notice: Under 35 U.S.C. 154(b), the term of this patent shall be extended for 0 days.

(21) Appl. No.: 09/068,147
(22) PCT Filed: Nov. 8, 1996
(86) PCT No.: PCT/CA96/00739
   § 371 Date: Aug. 26, 1999
   § 102(e) Date: Aug. 26, 1999
(87) PCT Pub. No.: WO97/17566
   PCT Pub. Date: May 15, 1997

(30) Foreign Application Priority Data

Nov. 8, 1995 (CA) .................................................. 2162424

(51) Int. Cl.[7] .............................. B08B 9/055; E21B 37/02
(52) U.S. Cl. .................................... 405/211.1; 15/104.061; 166/170; 166/902
(58) Field of Search .................. 15/104.061, 104.12; 405/211.1; 166/170, 174, 243, 902

(56) References Cited

U.S. PATENT DOCUMENTS

| | | | |
|---|---|---|---|
| 2,860,356 | * 11/1958 | Matheny | 15/104.061 |
| 4,769,598 | 9/1988 | Krieg et al. | 324/219 |
| 5,208,936 | 5/1993 | Campbell | 15/104.061 |

* cited by examiner

Primary Examiner—Eileen D. Lillis
Assistant Examiner—Tara L. Mayo
(74) Attorney, Agent, or Firm—Finnegan, Henderson, Farabow, Garrett & Dunner L.L.P.

(57) ABSTRACT

An apparatus for use in a pipeline is disclosed. The apparatus has a housing through which pipeline fluids may enter from the rear of the housing, pass through the housing and subsequently exit from the housing. A first bonnet, having several openings, is mounted at the front of the housing on a shaft which is oriented parallel to the longitudinal axis of the housing. A second bonnet is mounted on the housing and fits over the first bonnet. The second bonnet has openings which, when aligned with the openings in the first bonnet, permit the flow of pipeline fluid out of the housing in various directions. The first bonnet is movable in relation to the second bonnet so as to vary the degree of alignment of the openings in the bonnets. By varying the degree of alignment of the openings in the bonnets, the flow of fluids through the housing is regulated so as to control the speed of the apparatus.

13 Claims, 17 Drawing Sheets

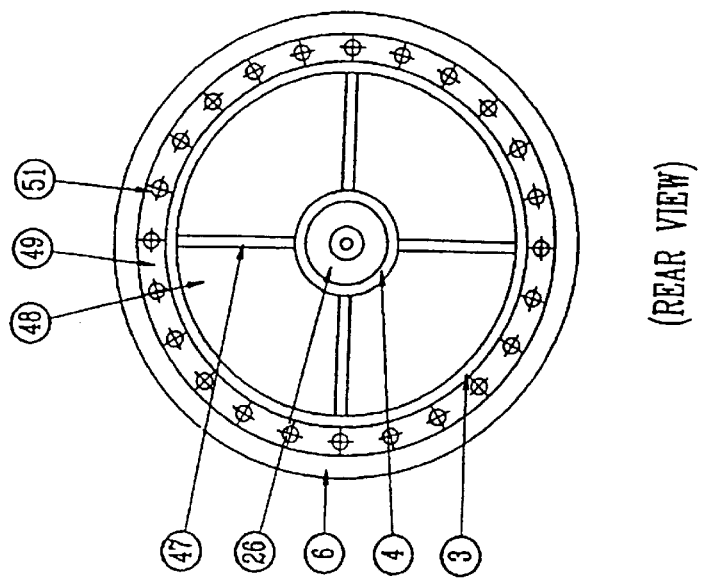
(REAR VIEW)
FIGURE-7
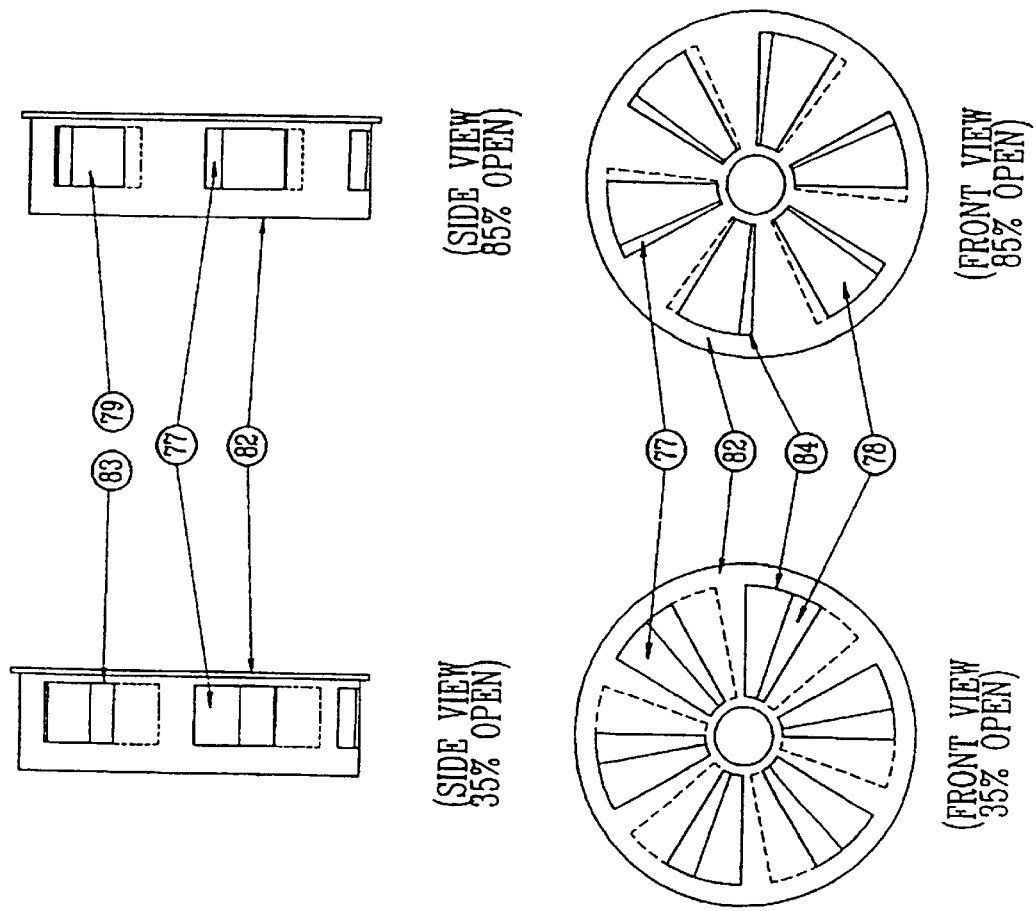
FIGURE-6B
FIGURE-6A

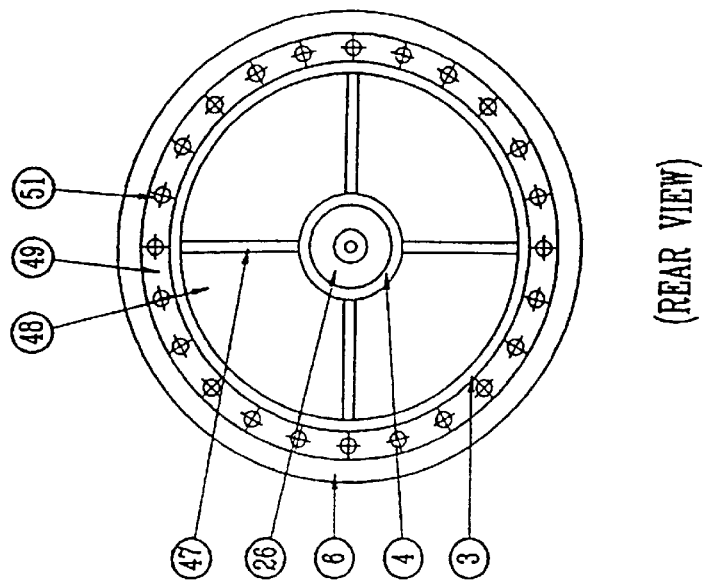
(REAR VIEW)
FIGURE-9
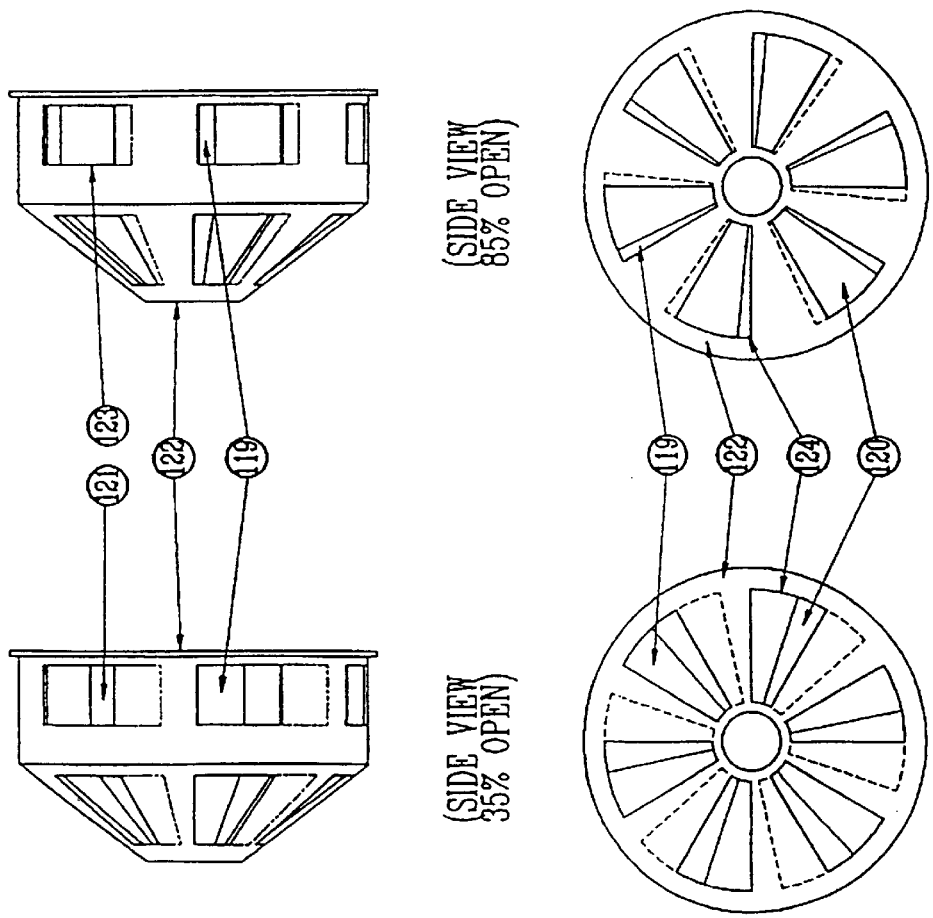
(SIDE VIEW 85% OPEN)
(FRONT VIEW 85% OPEN)
FIGURE-8B
(SIDE VIEW 35% OPEN)
(FRONT VIEW 35% OPEN)
FIGURE-8A

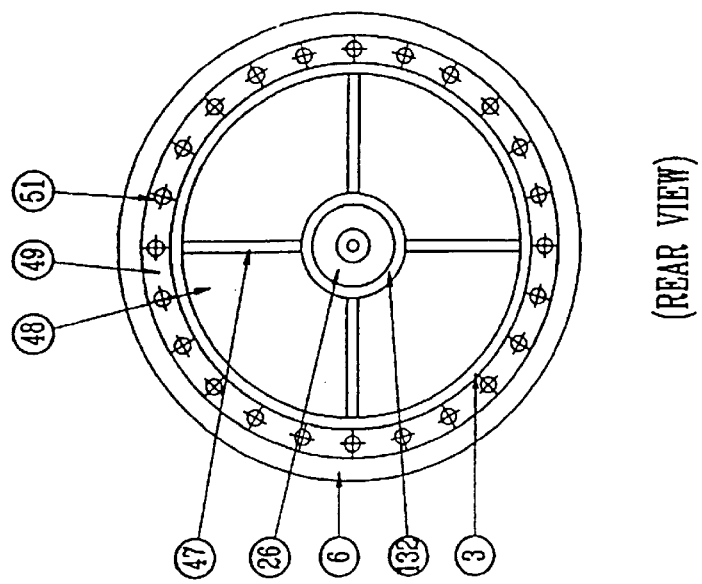
(REAR VIEW)
FIGURE-11
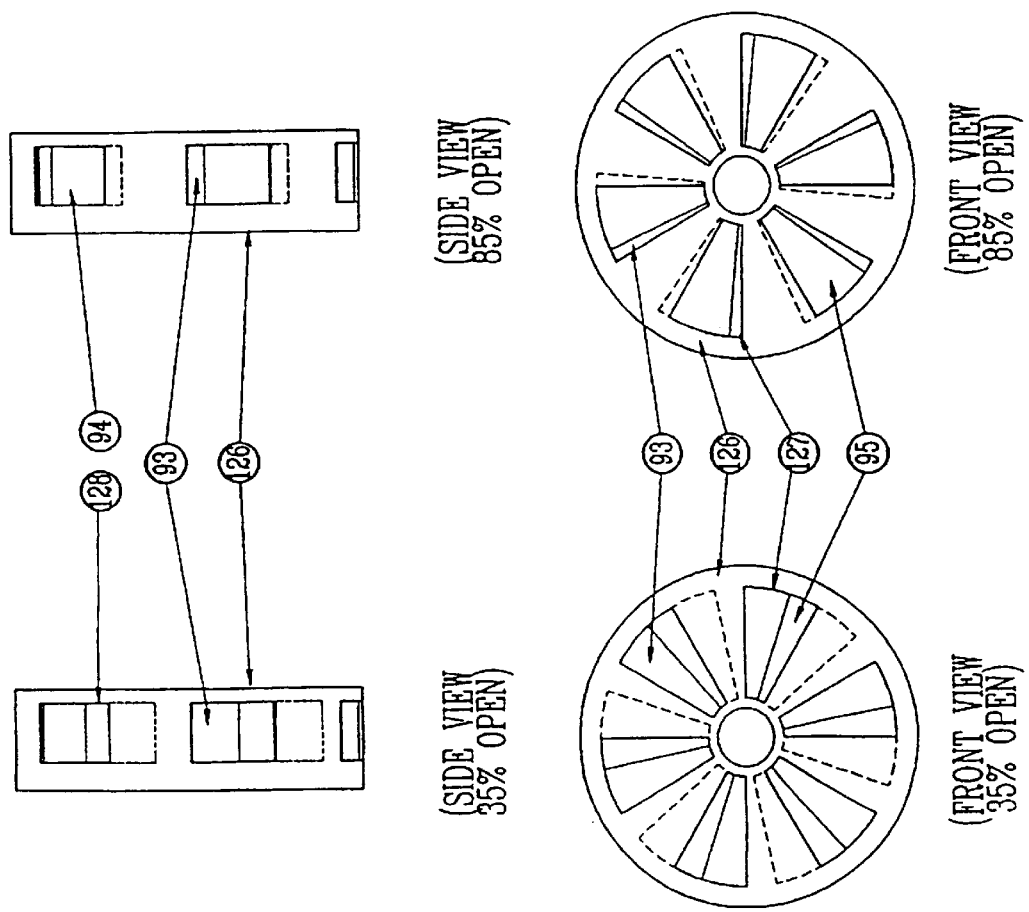
FIGURE-10B
FIGURE-10A

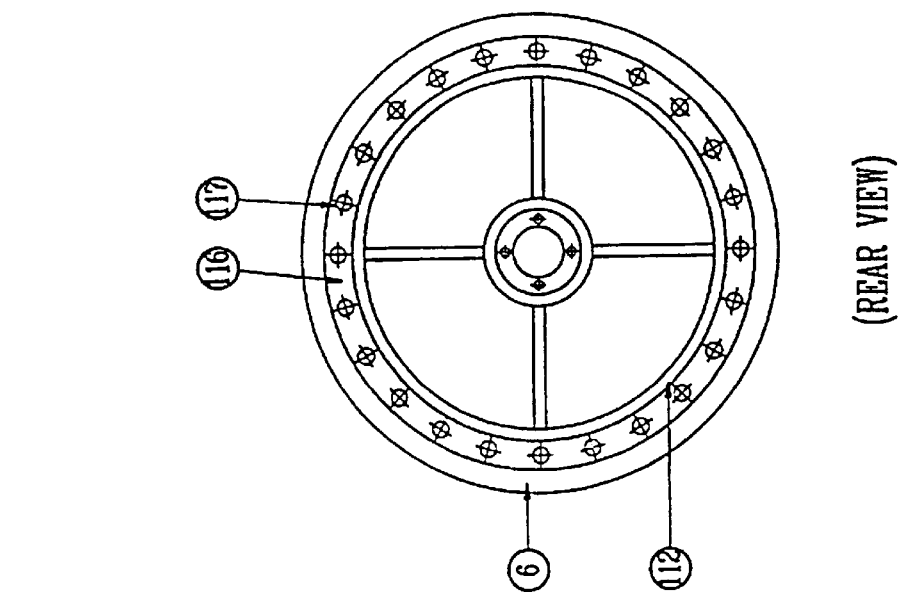
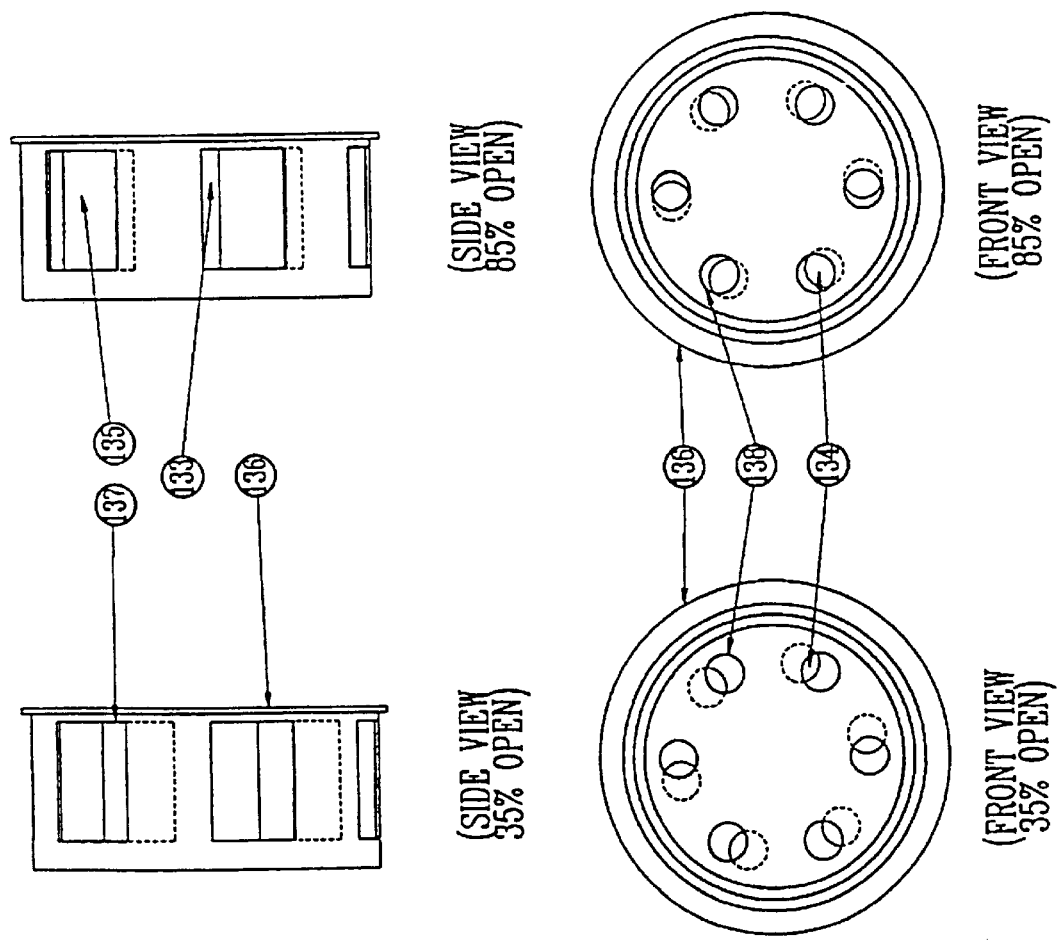
FIGURE-13 (REAR VIEW)
FIGURE-12B (FRONT VIEW 85% OPEN) (SIDE VIEW 85% OPEN)
FIGURE-12A (FRONT VIEW 35% OPEN) (SIDE VIEW 35% OPEN)

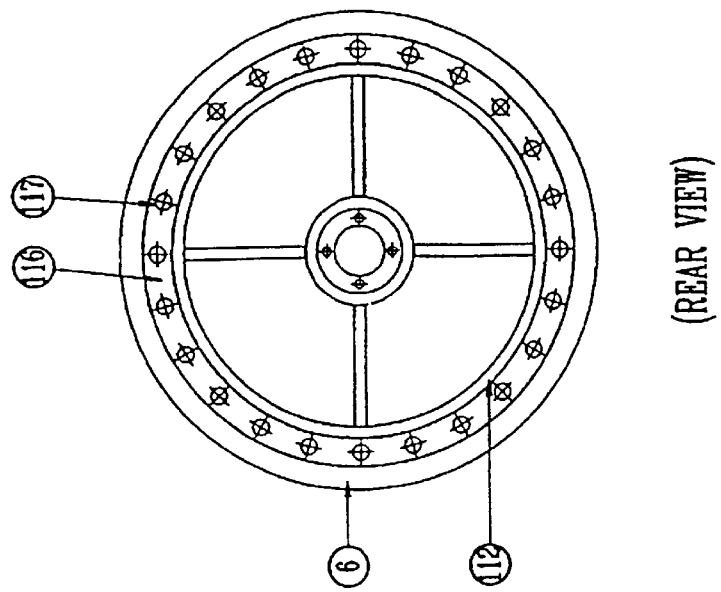
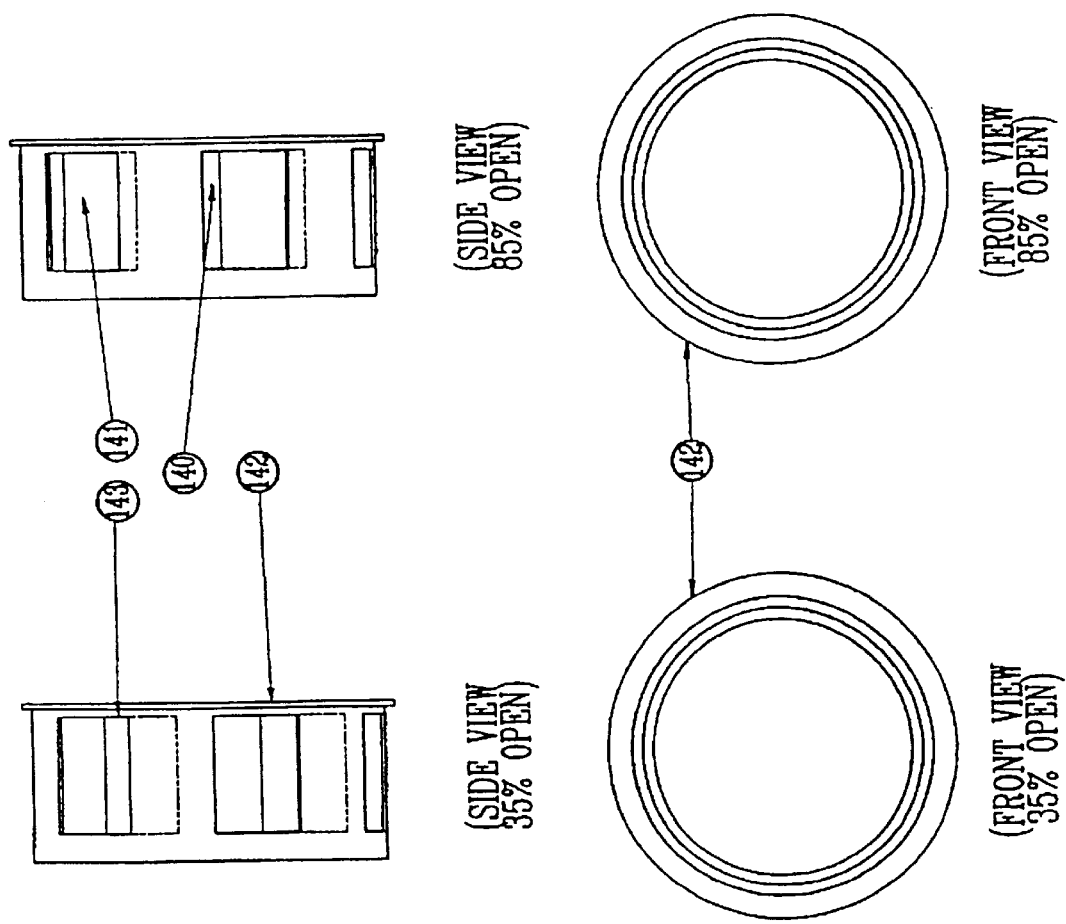

APPARATUS FOR USE IN A PIPELINE

FIELD OF THE INVENTION

The present invention relates to an apparatus for use in a pipeline. More specifically, thep present invention relates to a pipeline apparatus whose speed may be controlled.

BACKGROUND OF THE INVENTION

The term "pig", which is an acronym for pipeline inspection gauges, is used to refer to devices which are propelled along the interior of a pipeline for various purposes. A pig is typically propelled along the pipeline under the pressure of pipeline fluids, namely gas or liquids. In the absence of any speed control means for the pig, the pig will be propelled along the interior of the pipeline at the same speed as the pipeline fluids. The pig may tow other tools such as smart pigs that measure or monitor the condition of the interior of the pipeline, or it may stand alone and, for example, push debris along the pipeline and away from low spots in the pipeline. When used for any of the foregoing purposes, it is desirable that the pig maintain a preset speed in the range of, for example, 3–5 miles per hour (5–8 kilometres per hour).

U.S. Pat. No. 5,208,936 to Campbell describes a variable speed pig for pipelines having two plates with openings where the plates are disposed in the pig housing at opposite ends of flow through passageways. Annular seals seal off the annulus between the pig housing and the pipeline such that pipeline fluids cannot pass through this annulus. Openings in one plate can be aligned with the flow through passageways and with openings in the other plate through rotation of one plate relative to the passageways. Varying the degree of alignment of these openings in relation to the passageways, in turn, varies the amount of pipeline fluids which may pass through the flow through passageways and hence through the pig's housing with the result that the pig's speed can be increased or decreased relative to the pipeline fluid speed as desired.

U.S. Pat. No. 4,769,598 to Krieg et al. describes an apparatus for electromagnetically testing pipeline walls. The apparatus has two hollow cylindrical carriages which are coupled together for movement along the inside of a pipeline. The carriages are of a diameter which is approximately half of the pipeline's diameter and are supported against the pipeline walls by means of rollers disposed around the circumference of the carriages. Two sealing discs are mounted near the front of the first carriage which bear with their circumference against the pipeline wall and shut off the cross-section in an outer annular region at the front end of the first carriage. Between the two sealing discs and a reduced area nose of the first carriage is an annular passage through which pipeline fluids can pass from behind the apparatus to the front. Two perforated discs are mounted near the front of the first carriage and are rotatable in relation to one another. The degree of alignment of the perforations in the two discs permits the speed of the apparatus to be varied by permitting more or less pipeline fluid to pass through the annular passage. A set of brakes is also mounted on the carriage for emergency braking or if the control capabilities of the annular passage are exceeded.

The pigs described in the foregoing Campbell and Krieg patents are limited by the extent to which they are capable of permitting the bypass of pipeline fluid (i.e. through the pig) so as to vary the speed of the pigs. There has therefore developed a need for a pig that is better able to maintain a speed within a preset range in a pipeline, while bypassing any excess pipeline fluids not required for propulsion of the pig.

SUMMARY OF THE INVENTION

In one aspect, the present invention provides an apparatus for use in a pipeline, the pipeline having an interior surface in contact with the apparatus, the apparatus being propelled within the pipeline by pipeline fluids flowing therein, the apparatus comprising: a housing having a front end, a back end, a vertical axis, a longitudinal axis, an entry opening adjacent the back end through which pipeline fluids may enter the housing and an exit opening adjacent the front end through which pipeline fluids may exit the housing, the exit opening being in fluid communication with the entry opening, means disposed peripherally of the housing for sealing engagement of the housing with the interior surface of the pipeline; at least two bonnets having openings, the bonnets extending from the front end of the housing; wherein at least one of the bonnets is movable in relation to the other bonnet; and means for variably aligning the openings in the bonnets so as to permit the exit of pipeline fluids through the exit opening, through the aligned openings and from the housing at an acute angle to the vertical axis.

One of the bonnets may be mounted on a shaft extending from the housing and oriented parallel to the longitudinal axis of the housing.

The bonnets may comprise: a first bonnet of generally cylindrical shape, open at one end, having a plurality of first circumferential openings disposed around its curved surface; a second bonnet having a curved surface for closely fitting about the curved surface of the first bonnet, the second bonnet having a plurality of second circumferential openings disposed around its curved surface.

The first bonnet may also have a plurality of first radial openings disposed around its flat surface; and the second bonnet may also have a plurality of second radial openings disposed around its flat surface.

The means for variably aligning the openings in the bonnets may comprise: sensor means for producing first signals indicative of the speed of the pig; control means responsive to the first signals to produce control signals; drive means responsive to the control signals; at least one of the bonnets being movable by the drive means in relation to the other bonnet so as to vary the degree of alignment between the first openings and the second openings.

The drive means, power supply and the control means may be disposed in a controlmodule located within the housing.

The apparatus may further comprise: a manifold bonnet of cylindrical shape, open at one end, extending from the front end of the housing, the manifold bonnet having a plurality of third circumferential openings disposed around its curved surface. The manifold bonnet may also have a plurality of third radial openings disposed around its flat surface.

The at least two bonnets may comprise: a first bonnet having a cylindrical portion, open at both ends, and a truncated conical portion extending from the cylindrical portion, the first bonnet having a plurality of first circumferential openings disposed around the curved surface of its cylindrical portion; a second bonnet having a cylindrical portion, open at both ends, and a truncated conical portion extending from the cylindrical portion, the second bonnet having a plurality of second circumferential openings disposed around the curved surface of its cylindrical portion; one of the bonnets being mounted so that it closely fits about the other bonnet. The first bonnet may also have a plurality of first radial openings disposed around its truncated conical portion; and the second bonnet may also have a plurality of second radial openings disposed around its truncated conical portion.

In another aspect, the invention provides an apparatus for use in a pipeline, the pipeline having an interior surface in contact with the apparatus, the apparatus being propelled within the pipeline by pipeline fluids flowing therein, the apparatus comprising: a housing having a front end, a back end, a vertical axis, a longitudinal axis, an entry opening adjacent the back end through which pipeline fluids may enter the housing and an exit opening adjacent the front end through which pipeline fluids may exit the housing, the exit opening being in fluid communication with the entry opening; means disposed peripherally of the housing for sealing engagement of the housing with the interior surface of the pipeline; a shaft mounted on the housing and extending from the front end of the housing and oriented such that it is parallel to the longitudinal axis of the housing; a first bonnet of generally cylindrical shape, open at one end, rotationally mounted on the shaft, the first bonnet having a plurality of first circumferential openings disposed around its curved surface; a second bonnet of generally cylindrical shape, open at one end, extending from the front end of the housing for closely fitting about the first bonnet, the second bonnet having a plurality of second circumferential openings disposed around its curved surface; sensor means for producing first signals indicative of the speed of the pig; control means responsive to the first signals to produce control signals; drive means responsive to the control signals; the first bonnet being rotatable by the drive means in relation to the second bonnet so as to vary the degree of alignment between the first openings and the second openings.

In another aspect, the invention provides an apparatus for use in a pipeline, the pipeline having an interior surface in contact with the apparatus, the apparatus being propelled within the pipeline by pipeline fluids flowing therein, the apparatus comprising: a first housing having a front end and a back end; a second housing having a front end, a back end, a longitudinal axis and a vertical axis; means disposed peripherally of the first housing for sealing a first exterior annulus between the interior surface of the pipeline and the first housing; means disposed peripherally of the second housing for sealing a second exterior annulus between the pipeline and the second housing; a control module located in the interior of the second housing; a shaft mounted to the second housing and extending from the front end of the second housing and oriented such that it is parallel to the longitudinal axis of the second housing; a first bonnet of generally cylindrical shape, open at one end, mounted on the shaft, the first bonnet having a plurality of first circumferential openings disposed around its curved surface; a second bonnet of generally cylindrical shape, open at one end, mounted on the back end of the first housing for closely fitting about the first bonnet, the second bonnet having a plurality of second circumferential openings disposed around its curved surface; a third bonnet of generally cylindrical shape, open at one end, mounted on the back end of the second housing, the third bonnet having a plurality of third circumferential openings disposed around its curved surface; sensor means for producing first signals indicative of the speed of the pig; control means responsive to the first signals to produce control signals; drive means responsive to the control signals; the first bonnet being movable by the drive means in relation to the second bonnet so as to vary the degree of alignment between the first openings and the second openings. The bonnets may also have radial openings disposed around their flat surfaces.

The bonnets may be of various shapes and sizes and may be mounted on or in relation to the housing in a variety of ways. The bonnets are mounted such that pipeline fluids can only exit the housing through the aligned openings in the bonnets.

A nose cone may be mounted on the bonnet which is the furthest downstream so as to protect the bonnet from damage due to pipeline obstructions. A pig extraction ring may be mounted on the nose cone for facilitating the removal of the pig from the pipeline. The nose cone may be of generally conical shape truncated at its front end and may have openings disposed around its surface so as to permit the flow of pipeline fluids out of the front of the housing.

The speed of the pig may be varied through varying the degree of alignment of the first and second radial openings and the degree of alignment of the first and second circumferential openings. For example, the pig speed could be increased by rotating the first bonnet from a position in which a portion of the first radial and circumferential openings are aligned with the second radial and circumferential openings, respectively, such that pipeline fluids may exit the housing through the aligned openings to a position in which substantially none of the first openings are aligned with the second openings such that pipeline fluids cannot exit the housing.

The speed of the pig in a pipeline may be controlled by: pre-selecting a desired speed of the pig; determining the actual speed of the pig; comparing the desired speed of the pig with the actual speed; and either decreasing the degree of alignment of the first and second openings (where the actual speed is lower than the desired speed by a preset amount) or increasing the degree of alignment of the first and second openings (where the actual speed is higher than the desired speed by a preset amount).

In another aspect of the invention, use is made of an annulus between the pipeline wall and the pig housing in addition to another annulus between the housing and the control module to transport pipeline fluids through the housing. In contrast to the other embodiments, in this embodiment the pig housing is comprised of several elements. A nose cone is mounted on the front end of a forward housing module. A first bonnet, in the shape of a cylinder which is open at one end, fits within a second bonnet of similar shape. The second bonnet has a flange around the perimeter of the open end which is bolted or otherwise secured to the back end of the forward housing module. The first bonnet has a plurality of first radial openings disposed around its flat surface and a plurality of first circumferential openings disposed around its curved surface. The second bonnet has a plurality of second radial openings disposed around its flat surface and a plurality of second circumferential openings disposed around its curved surface. The first bonnet may be rotationally mounted on a shaft extending from a central housing module. The central housing module contains the control means for operating the pig and the shaft may be mounted on a control module located in the interior of the central housing module. A third bonnet is fixedly mounted to the back end of the central housing module. The third bonnet is of generally cylindrical shape and is open at one end. The third bonnet has a plurality of third radial openings disposed around its flat surface and a plurality of third circumferential openings disposed around its curved surface. A frame is mounted to the back end of the third bonnet to support one of more odometer wheels and a rear bumper.

In operation, the pipeline fluids enter the pig through the third bonnet. From there, the pipeline fluids may exit the third bonnet through the third radial openings (in which case they will pass into an internal annulus between the central housing module and the control module located within the central housing module) and through the third circumferential openings (in which case they will pass through an exterior annulus between the pipeline and the pig). For the fluids which travel through the exterior annulus, a medial annular seal mounted at the back of the forward housing module will prevent the fluids from travelling any further forward through this annulus. Through rotation of the first bonnet or other movement of the first bonnet relative to the second bonnet, the first and second openings may be selectively aligned so as to permit the desired level of flow of pipeline fluids into the forward housing module. In the case of the fluids which have passed through the third radial openings into the interior annulus, these fluids may pass through the first and second radial openings to the extent that these openings are aligned by virtue of the rotation of the first bonnet relative to the second bonnet. In the case of the fluids which have passed through the third circumferential openings into the exterior annulus, these fluids may pass through the first and second circumferential openings to the extent that these openings are aligned by virtue of the rotation of the first bonnet relative to the second bonnet. From that point on, the fluids are then free to pass through the forward housing module, through the openings in the nose cone and hence out of the pig. In this manner, the speed of the pig can thus be selectively controlled.

In another aspect of the invention, similar to the previous embodiment, the radial openings in the first, second and third bonnets are removed such that the flow of pipeline fluids is through the circumferential openings in the third bonnet, through the exterior annulus, through the aligned circumferential openings in the first and second bonnets, through the forward housing module and through the openings in the nose cone. The speed of the pig can therefore be controlled by varying the degree of alignment between the first and second circumferential openings.

BRIEF DESCRIPTION OF THE DRAWINGS

There will now be described various embodiments of the invention, with reference to the following drawings, by way of illustration and not of limitation, in which like numerals denote like elements and in which:

FIGS. 6A and 6B are front and side views of the bonnets of the pig depicted in FIG. 1, showing respectively bonnet openings which are 35% aligned and bonnet openings which are 85% aligned;

FIG. 7 is a rear view of the bonnet assembly of the pig of FIG. 1;

FIGS. 8A and 8B are front and side views of the bonnets of the pig depicted in FIG. 2, showing respectively bonnet openings which are 35% aligned and bonnet openings which are 85% aligned;

FIG. 9 is a rear view of the bonnet assembly of the pig of FIG. 2;

FIGS. 10A and 10B are front and side views of the bonnets of the pig depicted in FIG. 3, showing respectively bonnet openings which are 35% aligned and bonnet openings which are 85% aligned;

FIG. 11 is a rear view of the bonnet assembly of the pig of FIG. 3;

FIGS. 12A and 12B are front and side views of the bonnets of the pig depicted in FIG. 4, showing respectively bonnet openings which are 35% aligned and bonnet openings which are 85% aligned;

FIG. 13 is a rear view of the bonnet assembly of the pig of FIG. 4;

FIGS. 14A and 14B are front and side views of the bonnets of the pig depicted in FIG. 5, showing respectively bonnet openings which are 35% aligned and bonnet openings which are 85% aligned;

FIG. 15 is a rear view of the bonnet assembly of the pig of FIG. 5;

DETAILED DESCRIPTION OF THE PREFERRED EMBODIMENTS

Referring to FIGS. 1A, 1B, 6A, 6B, 7 and 16, there is illustrated a preferred embodiment of a pig according to the invention in which the speed of the pig may be variably adjusted during use to compensate for the variable conditions inside the pipeline. A pig 2 is shown within a pipeline 1. For ease of reference, the downstream end of the pig is referred to herein as the "front" end and the upstream end of the pig is referred to as the "rear" or "back" end. Accordingly, in FIG. 1A, the flow of pipeline fluids is from the right to the left. In other words, the pipeline fluids flow into an entry opening adjacent the rear or upstream end of the pig housing 3, through the interior of the pig housing and exit the pig housing through an exit opening disposed adjacent the front or downstream end of the pig housing. The exit opening is in fluid communication with the entry opening.

Figure 16:
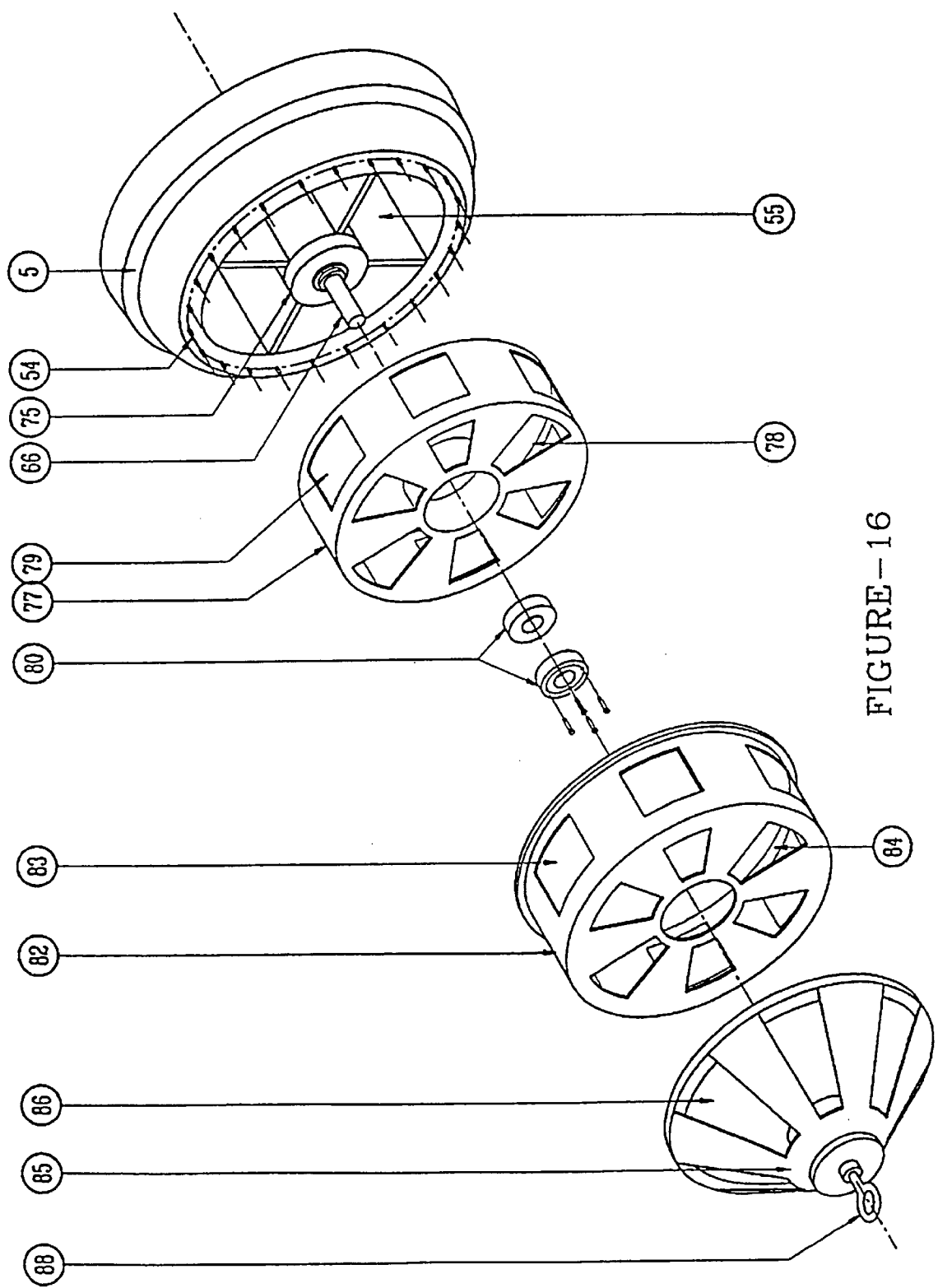
FIG. 16 is an exploded view of the bonnet assembly of the pig of FIG. 1.
Figure 17:
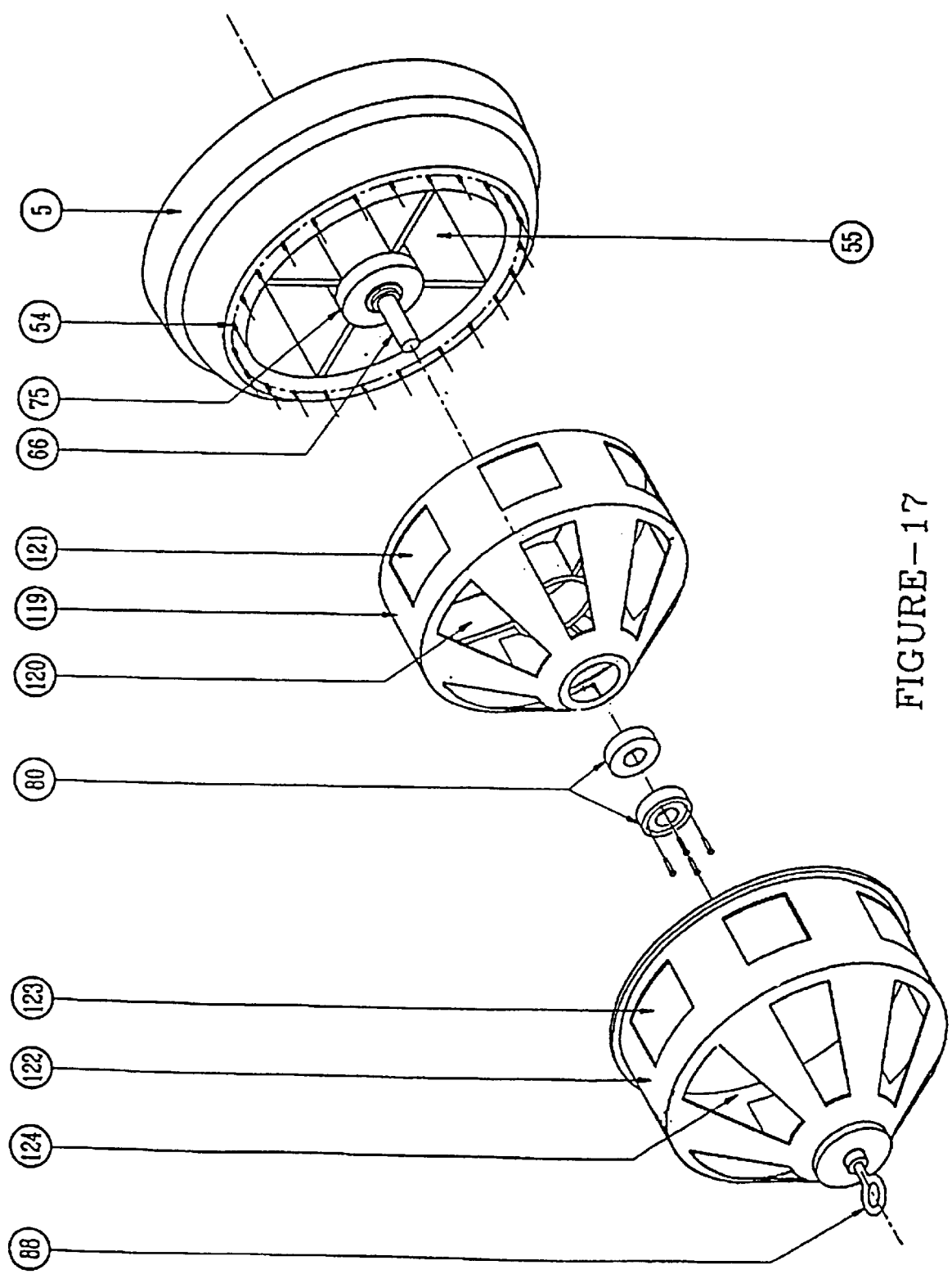
FIG. 17 is an exploded view of the bonnet assembly of the pig of FIG. 2.
Figure 18:
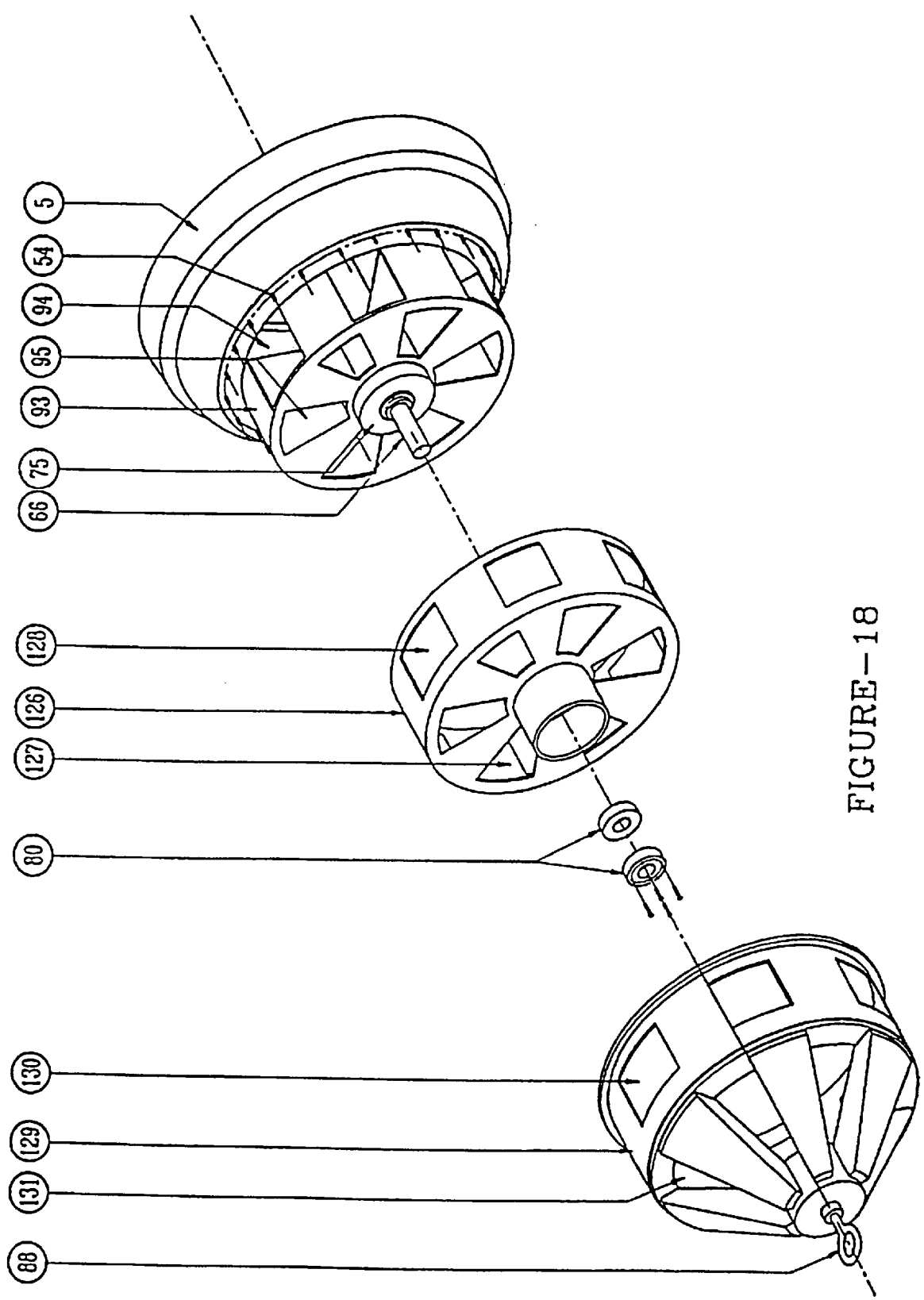
FIG. 18 is an exploded view of the bonnet assembly of the pig of FIG. 3.
Figure 19:
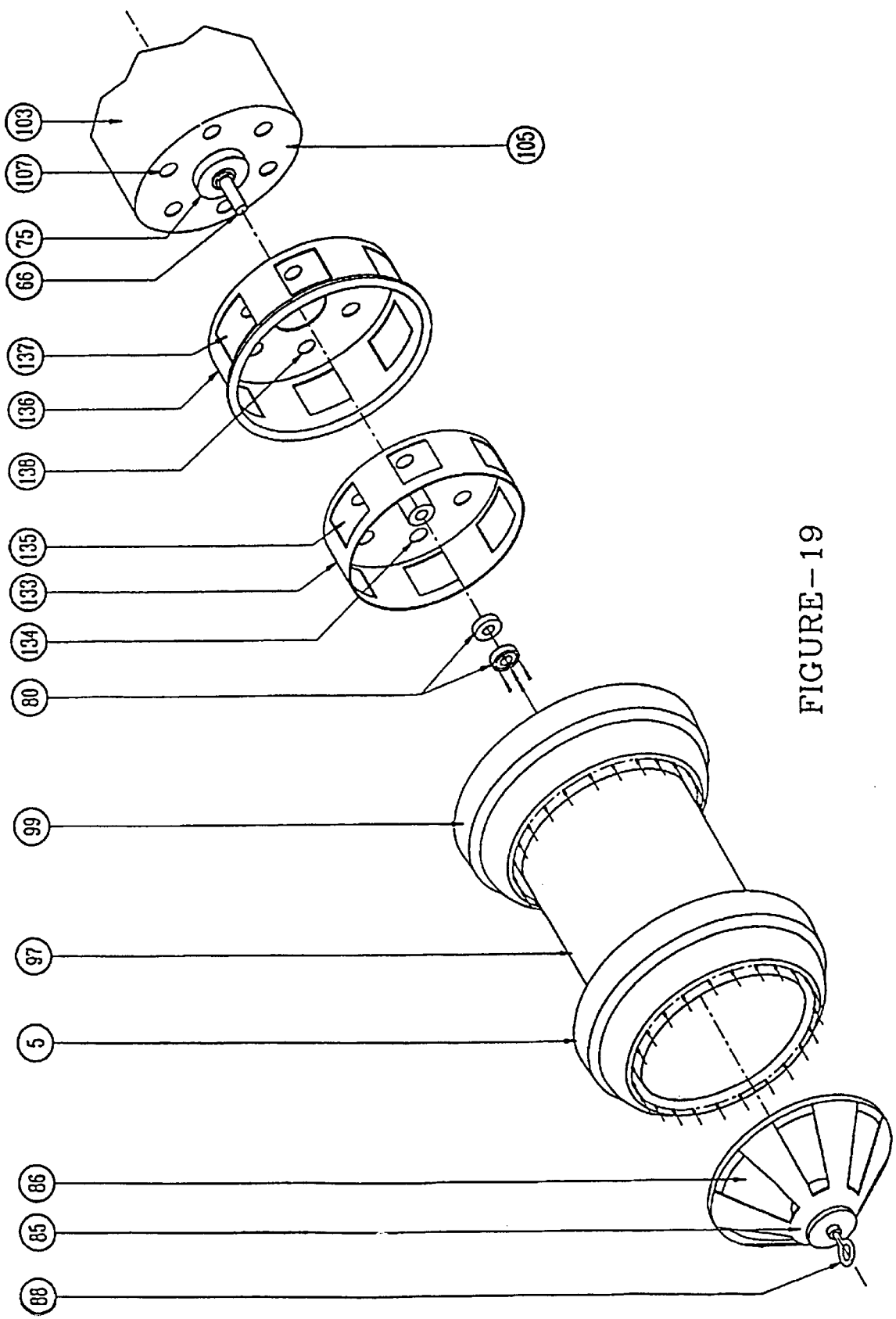
FIG. 19 is an exploded view of the bonnet assembly of the pig of FIG. 4.
Figure 20:
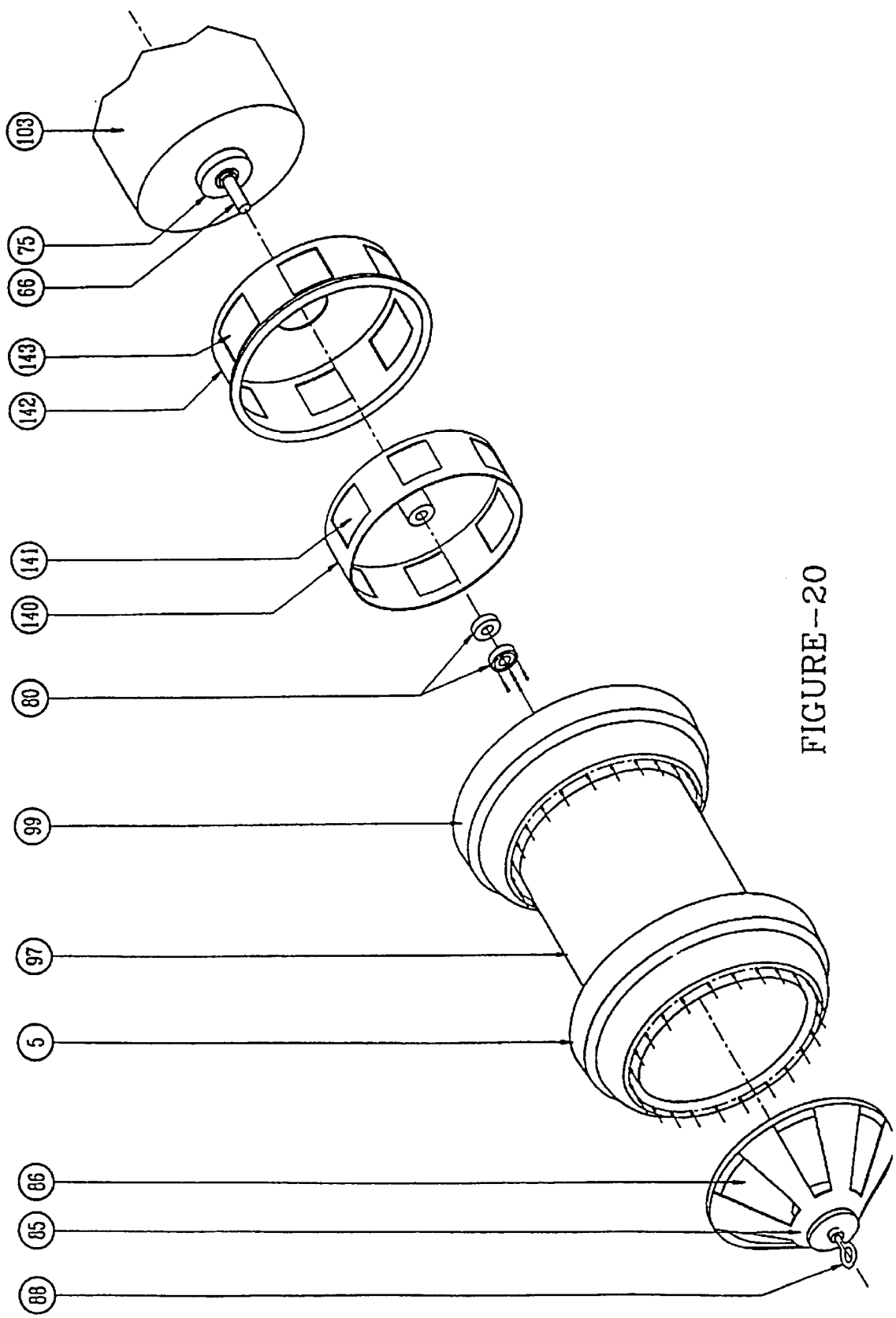
FIG. 20 is an exploded view of the bonnet assembly of the pig of FIG. 5.

A first bonnet 77 is mounted on a rotating shaft 66 and is held in place by a locking collar 80 which is threaded onto the rotating shaft 66. The term "bonnet" is used herein to refer to an element which is substantially open at one end and which has a depth dimension. The shape of the first bonnet is best illustrated by FIG. 16. The first bonnet is positioned such that the perimeter of its open end is substantially flush with the exit opening of the pig housing so as to prevent pipeline fluids from exiting the pig housing between the first bonnet and the front end of the pig housing. Bolts 81 secure the locking collar 80 on the first bonnet 77.

The rotating shaft 66 is supported by forward and rearward shaft bearings 71 and 69, respectively. The bearing system may, for example, be of the type sold under the trade-mark SKF TM 3306E, readily commercially available. Other suitable bearing systems will be known to those skilled in the art. A bearing spacer 70 is placed between the forward and rearward shaft bearings 71 and 69, respectively to increase the support on the rotating shaft 66. The rotating shaft 66 and the forward and rearward shaft bearings 71 and 69, respectively, are held in place by inner and outer bearing retainer rings 67 and 68, respectively. Rotating shaft seals 72 seal the rotating shaft 66 from the pipeline environment. Rotating shaft bearing housing 73 houses the rotating shaft 66 components and includes seals 74 to seal the front end of the control module housing 4 from the pipeline environment.

The rotating shaft assembly 65 is secured to a rotating shaft assembly attachment ring 75 by bolts 76 and the rotating shaft assembly attachment ring 75 is threaded into the forward end of the control module housing 4. A motor drive assembly 57 includes a gear reducer 60, shaft locking mechanism 59, and a stepper motor 58. The rotating shaft 66 is connected to the motor drive assembly 57 via a gear reducer shaft 61. The gear reducer shaft 61 at one end of the gear reducer 60, extends into the gear reducer shaft cavity 62 in the rotating shaft 66, and is secured against rotation by a shaft key 63. The motor drive assembly 57 is attached to the rotating shaft assembly 65 via the outer bearing retainer ring 68 by bolts 64. The gear reducer 60, for example the gear reducer sold under the trade-mark HD Systems as model number RHS 32-50-CC, readily commercially available from HD Systems Ltd., Hauppauge, N.Y. United States of America, is designed to multiply the torque output of the stepper motor 58 and is connected on one end to the shaft locking mechanism 59. Other suitable gear reducer mechanisms will be apparent to those skilled in the art. The shaft locking mechanism 59 prevents the first bonnet 77 from rotation unless movement is initiated by the bonnet drive assembly 56, thereby eliminating any random bonnet movement. The shaft locking mechanism 59 is connected to the stepper motor 58, for example a BODINE model number 2409, readily commercially available from Soper's Supply Ltd. Edmonton, Canada, which powers the drive means.

Mounted at the front of the pig is a nose cone 85, having openings 86. The nose cone 85 may be secured by bolts 87 or by other conventional means to a second bonnet 82. The second bonnet 82 is mounted on the pig housing by bolts 54 or other conventional means. The functions of the nose cone 85 include protection of the second bonnet 82 from damage due to pipeline obstructions and support of a pig extraction ring 88 for removal of the pig 2 from the pipeline 1. Sealing engagement means in the form of forward and rearward annular seals 5 and 6, respectively, are disposed peripherally of the pig housing 3 for sealing an annulus 52 between the interior surface of the pipeline 1 and the pig housing 3. Forward annular seal 5 may secured by bolts 54 or other conventional means between the second bonnet 82 flange and a forward annular seal flange 53, on the pig housing 3. Rearward annular seal 6 may be secured by bolts 51 or other conventional means between a rearward annular seal flange 50 and rearward seal clamp ring 49, on the pig housing 3. The annular seals 5 and 6 are preferably made of urethane, or other commonly available pig rubber, well known to those skilled in this art.

A control module housing 4 is supported and centralized within the pig housing 3 by forward and rearward support struts 55 and 47, respectively. The control module housing 4 houses a battery power pack 45, bonnet drive assembly 56, and a speed controller 43. The battery power pack 45 provides power to the bonnet drive assembly 56 (i.e. stepper motor 58) and speed controller 43. The battery power pack 45 is secured by straps 46 and bolts 44, to two support rails 40 that run inside and along either side of control module housing 4. The support rails 40 are in turn supported by forward and rearward support rail brackets 41 and 37, respectively. The support rails 40 are secured to forward and rearward support rail brackets 41 and 37, respectively by bolts 42 and 39, respectively. The speed controller 43 is secured to the support rails 40 by bolts 44.

The pig 2 further includes the rear cap assembly 26. The rear cap assembly 26 seals the rear end of control module housing 4 from the pipeline environment and provides access to the battery power pack 45 and speed controller 43. The rear cap assembly 26 includes the rearward support rail bracket 37, rear cap housing 27, rear cap assembly attachment ring 34, and rear access plug 29. The rearward support rail bracket 37 (which supports the support rails 40 and the battery power pack 45 and speed controller 43) is secured to the rear cap housing 27 by bolts 38. The rear cap housing 27 includes seals 28 to seal the control module housing 4 from the pipeline environment. The rear cap housing 27 is secured to the rear cap assembly attachment ring 34 by bolts 35. The rear cap assembly attachment ring 34 is threaded into the rearward end of the control module housing 4 in order to secure the rear cap assembly 26. The rear cap assembly attachment ring 34 is aligned with the control module housing 4 by an alignment bolt 36. The rear access plug 29 is mounted in the rear cap housing 27 to provide ready and easy access to a RS 232 computer interface plug 32 or other computer interface means and pig power switch 33, before and after each pig run. The rear access plug 29 includes seals 30 to seal the control module housing 4 from the pipeline environment and a bleed valve 31 to vent down the control module housing 4, should any leakage occur into the housing from the pipeline.

The adjusting means for adjusting the bonnets in response to variations in the speed of the pig in the pipeline to maintain a desired speed of the pig will now be described by reference to FIGS. 1A, 1B, 6A, 6B, 7 and 16.

The ease with which gas or other pipeline fluids may pass through the interior of the housing is controlled by adjusting means comprising the first bonnet 77, drive means (such as bonnet drive assembly 56), sensor means (such as odometer wheel assembly 7) and control means (such as speed controller 43). The odometer wheel assembly 7 is suspended from the rearward end of the control module housing 4. The bonnet drive assembly 56 is located at the front end of the control module housing 4 and includes a rotating shaft assembly 65 and motor drive assembly 57. The rotating shaft assembly 65 includes a locking collar 80, rotating shaft 66, rotating shaft bearing housing 73, and a rotating shaft assembly attachment ring 75.

Figure 1A:
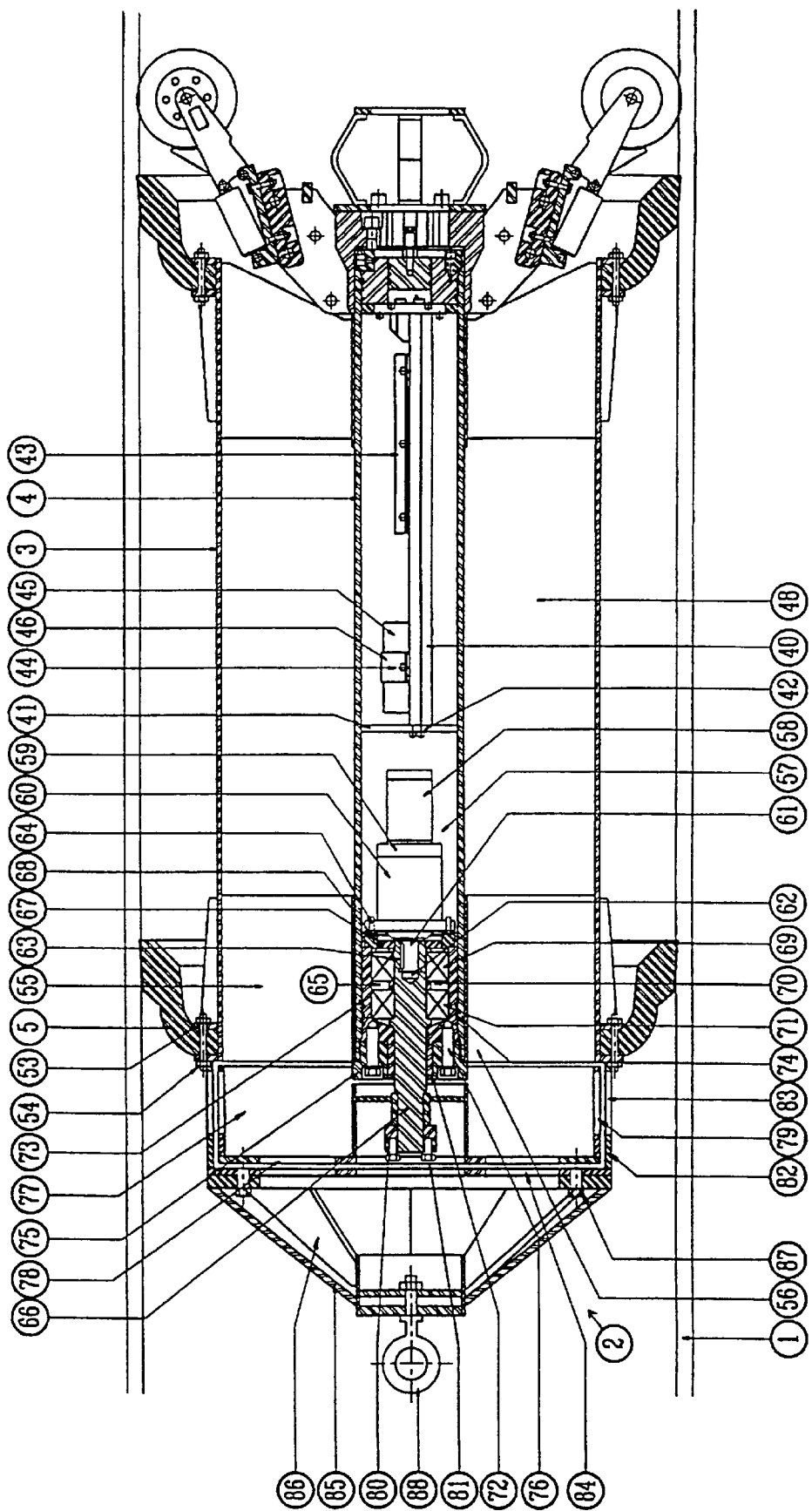
FIGS. 1A and 1B are identical side views in section of a first embodiment of a pig according to the invention (the drawings represent identical views but have been placed on separate pages to accomodate the number of reference numerals)

Referring to FIG. 1A, there is an annulus 48 located between the centrally supported control module housing 4 and pig housing 1 extending along the entire length of the pig housing 3. At the forward end of the pig housing 3 are bonnets for variably blocking the annulus 48. The means for blocking the annulus 48 include the first bonnet 77, bonnet drive assembly 56 and second bonnet 82. As seen particularly in FIG. 16, the first bonnet 77 has a plurality of first radial openings 78 disposed radially around its flat surface and a plurality of first circumferential openings 79 disposed around its curved surface. The second bonnet 82, as shown particularly in FIG. 16, is mounted on the front end of the pig housing 3 and has a plurality of second radial openings 84 disposed around its flat surface and a plurality of second circumferential openings 83 disposed around its curved surface, that are in fluid connection with the entry opening at the back end of the pig housing and with the annulus 48 when the second radial and circumferential openings, 84 and 83 respectively, are aligned with the first openings 78 and 79 in the first bonnet 77. The first openings 78 and 79 are alignable with the second openings 84 and 83 by movement of the first bonnet relative to the second bonnet. For example, rotation of the second bonnet relative to the first bonnet can be used to align the first and second openings. As noted above, the first bonnet 77 may be rotated by the bonnet drive assembly 56. The first bonnet 77 may be rotated in relation to the second bonnet 82 from a position in which the first openings 78 and 79 and second openings 84 and 83 are completely aligned in fluid connection with the entry opening at the back end of the pig housing and with the annulus 48 (thereby maximizing the flow of gas or liquid in the pipeline through the pig housing 3), to a position in which essentially none of the first openings 78 and 79 and second openings 84 and 83 are aligned in fluid connection, (thereby blocking the annulus 48). The amount of blockage of the annulus 48 may be varied according to the desired speed of the pig.

Figure 1B:
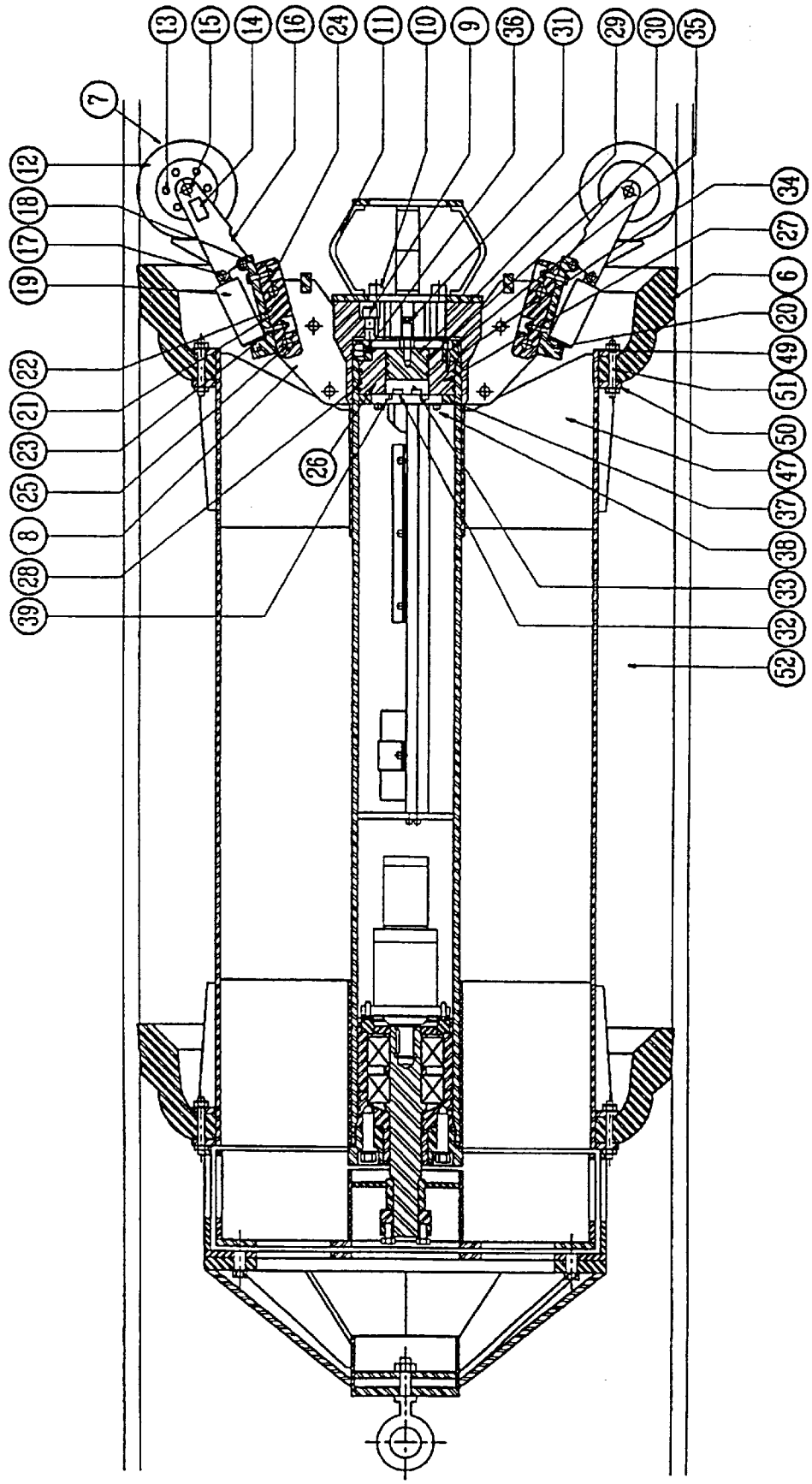
Figure 2:
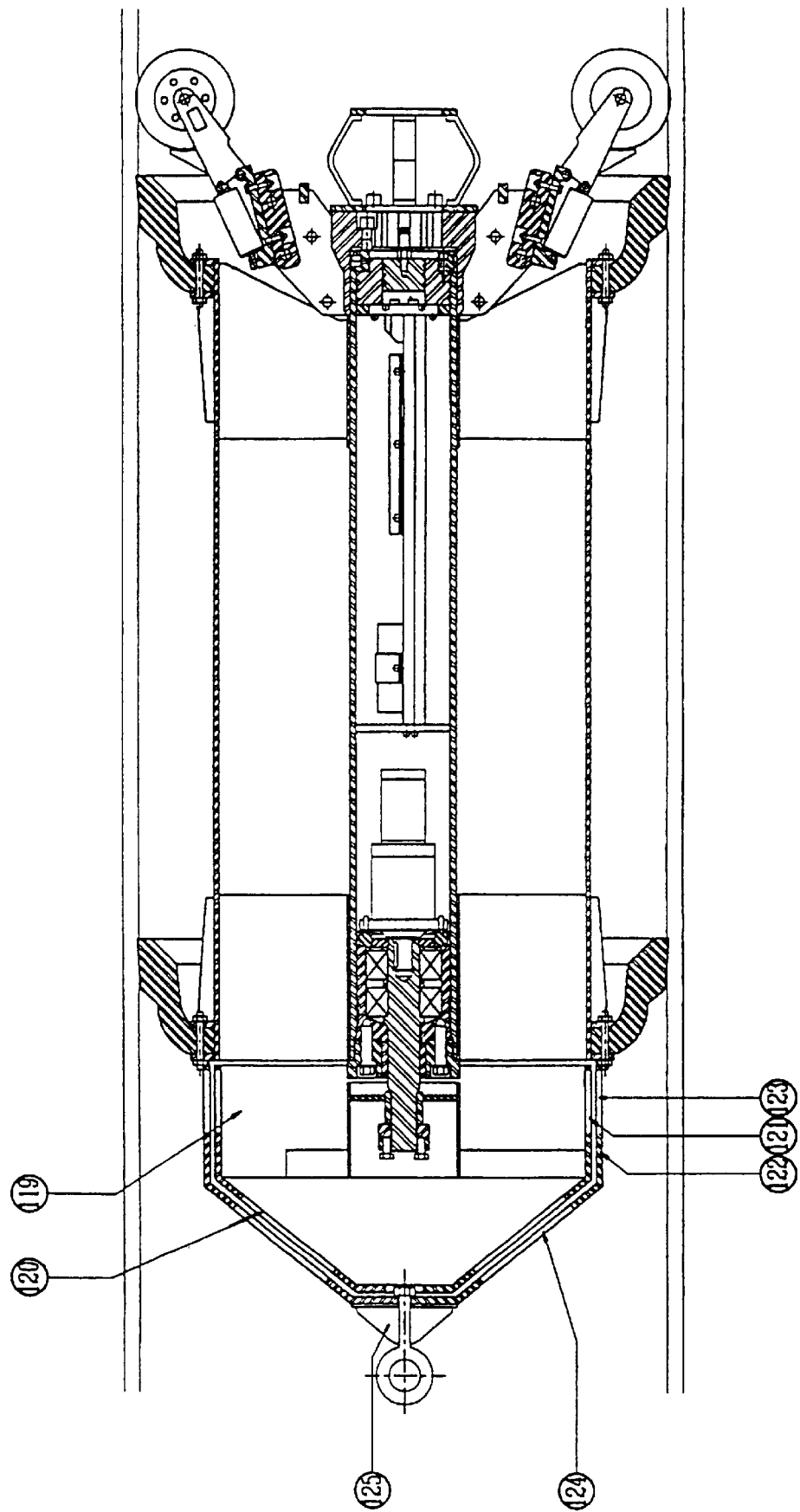
FIG. 2 is a side view in section of a second embodiment of a pig according to the invention.
Figure 3:
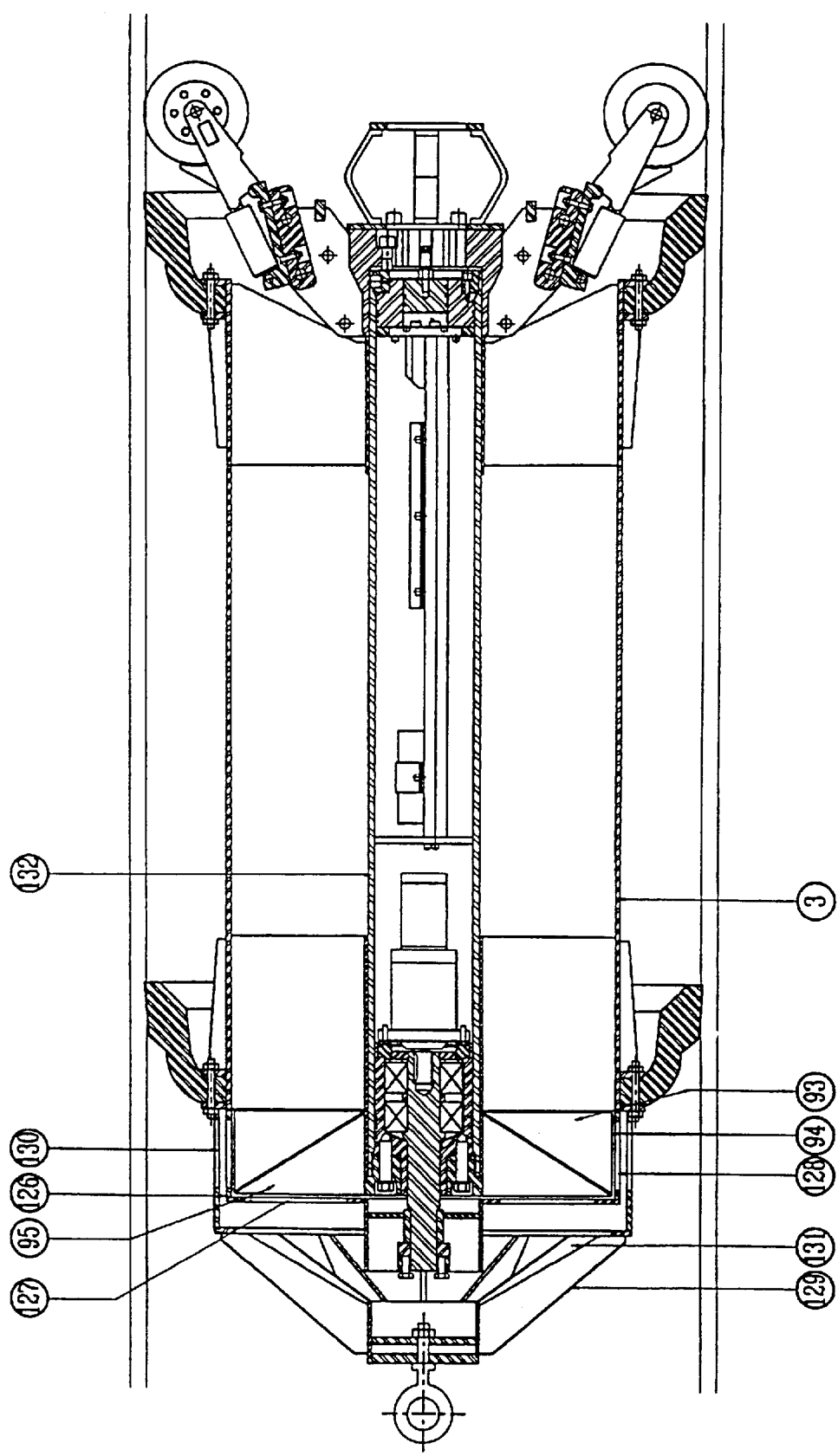
FIG. 3 is a side view in section of a third embodiment of a pig according to the invention.
Figure 4:
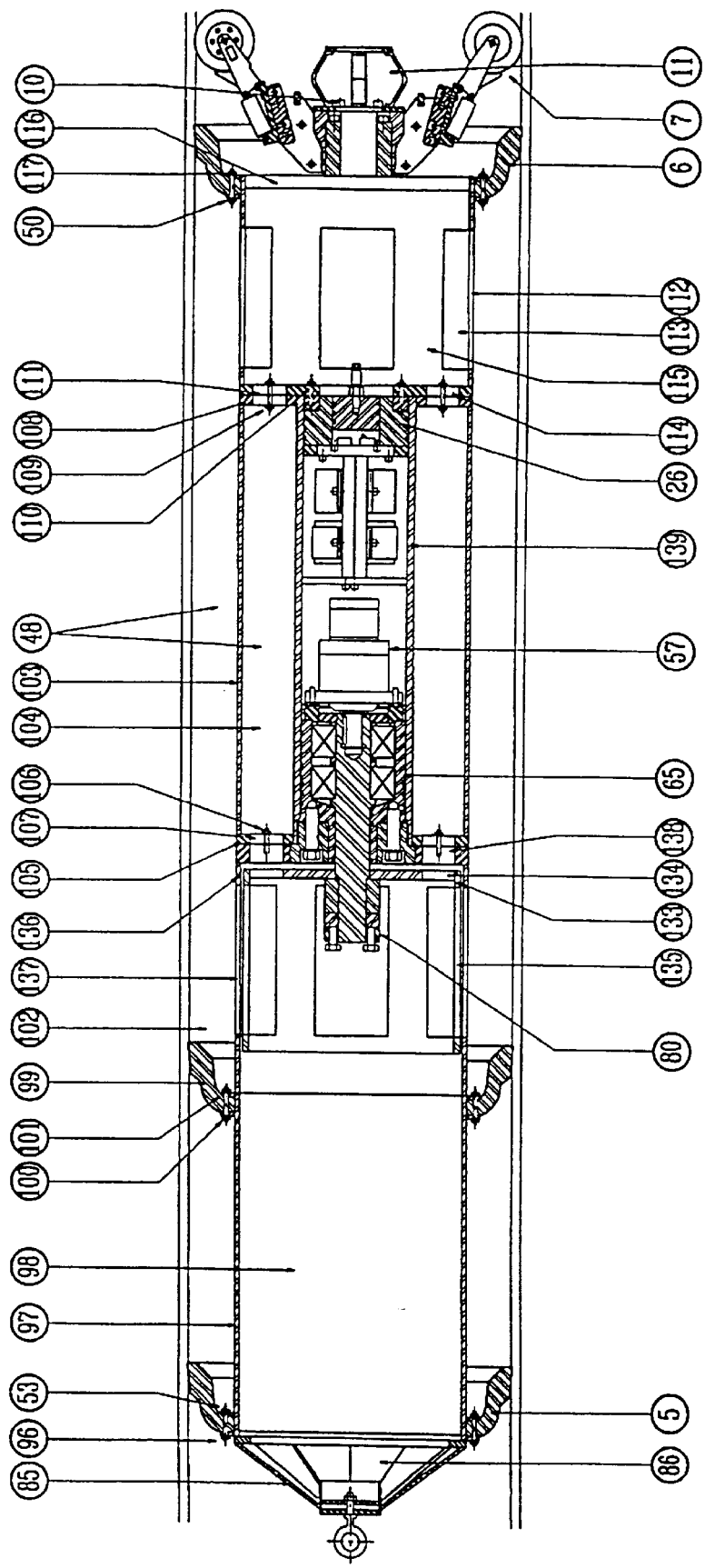
FIG. 4 is a side view in section of a fourth embodiment of a pig according to the invention.
Figure 5:
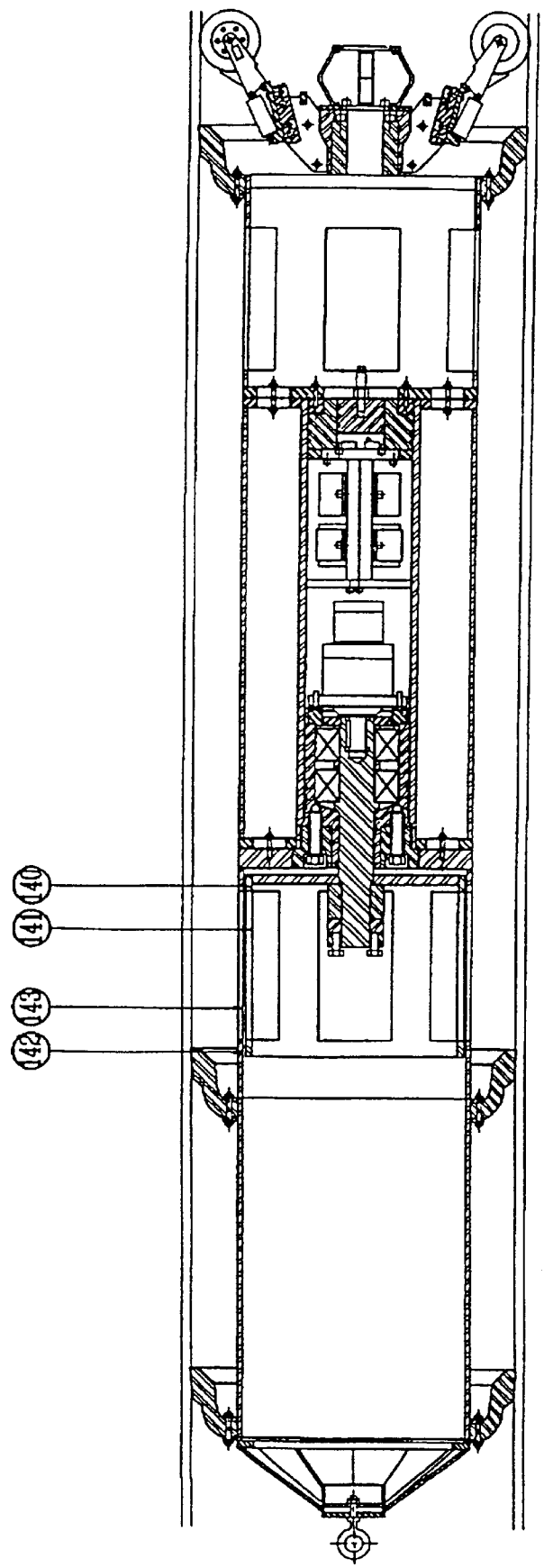
FIG. 5 is a side view in section of a fifth embodiment of a pig according to the invention.

Referring to FIG. 1B, the sensor means comprise an odometer wheel assembly 7. The odometer wheel assembly 7 includes an odometer wheel 12, a wheel support arm 16, a support arm spring 19, a support arm attachment base 21, and a wheel assembly attachment base 22. The odometer wheel 12 has a plurality of magnets 13. The odometer wheel 12 provides speed and distance information to the speed controller 43 when used in combination with a magnetic sensor, in this case velocity encoder 14. The odometer wheel 12 is secured to the wheel support arm 16 by a shaft 15. The upper portion of the wheel support arm 16 is secured to the support arm spring 19 by a pivot 17. The support arm spring 19 preloads the odometer wheel 12 to prevent wheel slippage when tracking along the pipeline 1 to ensure accurate speed and distance information is sent to the speed controller 43. The lower portion of the wheel support arm 16 and the support arm spring 19 are secured to the support arm attachment base 21 by a plurality of pivots 18 and 20, respectively. The support arm attachment base 21 is secured to the wheel assembly attachment base 22 by a plurality of bolts 23 and 24. A suspension bracket 8 provides a frame for mounting the two odometer wheel assemblies 7 and a rear bumper 11. The wheel assembly attachment base 22 is secured to the suspension bracket 8 by a plurality of pins 25. The rear bumper 11 is designed to prevent damage to the odometer wheel assemblies 7 and is secured to the suspension bracket 8 by a plurality of bolts 10. The suspension bracket 8 is secured to the rear cap assembly attachment ring 34 by a plurality of bolts 9.

The odometer wheel 12 rotates as the pig 2 travels along the pipeline 1. As a result the magnets 13 mounted on the odometer wheel 12 pass the velocity encoder 14 mounted on the wheel support arm 16. The movement of a magnet 13 past the velocity encoder 14 produces a pulsed signal whose frequency is indicative of the actual speed of the pig 2. The pulsed signal is fed to a speed controller 43 which, as shown in the schematic diagram of FIG. 21, comprises a counter timer 89, comparator and control circuit 91, stepper motor controller 92 and velocity select switches 90.

Figure 21:
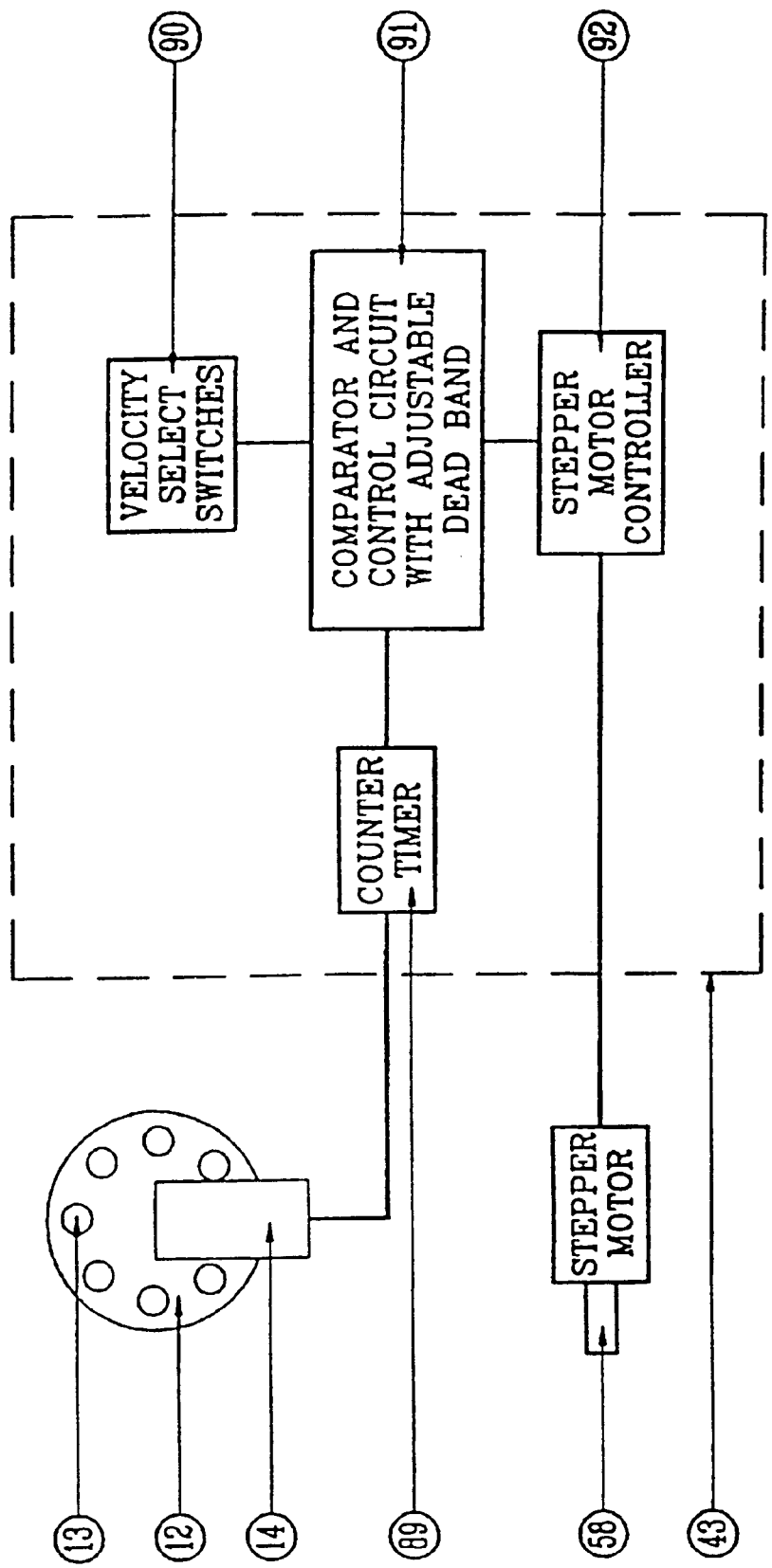
FIG. 21 is a schematic diagram of the control system for the pigs depicted in FIGS. 1 through 5.

Referring to FIG. 21, the frequency of the pulsed signal is fed to the counter timer 89 where it is converted into a voltage output which is indicative of the pig's speed. The voltage output of the counter timer 89 is then fed to the comparator and control circuit 91. The comparator and control circuit 91 may have any of several configurations, but the object of the circuit is to provide control signals to the stepper motor controller 92 that depend on whether the pig 2 is travelling faster or slower than a preset desired speed within a preset amount.

The comparator and control circuit 91 may carry out the following functions. By using the output of the counter timer 89 and comparing it with the preset desired speed, the counter timer provides a signal that is proportional to the magnitude of the difference between the actual and the desired pig speed. This signal may then be used to control the speed of the stepper motor 58 so that it operates faster when the actual and desired speeds are far apart, and slower when they are closer together. With a similar comparison of the actual and desired pig speeds, the direction of the movement of the stepper motor 58 may also be determined (that is, whether to open or block the flow through passageway 48) and fed to the stepper motor controller 92. The position of the first bonnet 77 is therefore tracked so that the control means can control the amount of blockage. The comparator and control circuit 91 should be set so that the stepper motor 58 is only enabled when the actual pig speed differs from the desired speed by a preset amount, thus defining a deadband. The comparator and control circuit 91 should also be set so that the stepper motor controller 92 is only enabled when the pig has travelled a preset distance from the launch position. Other features may also be incorporated including a bias so that the stepper motor controller 92 automatically sets the first bonnet 77 to the closed position on launch (blocking the flow through passageway 48) and various safety features such as a means for determining when the wheels have become stuck.

The dead band is the range of speeds in which the control means will not respond to changes in the speed of the pig, so that the bonnets are not being constantly adjusted during slight speed variations. If the desired speed is 4 mph (approximately 6.5 km/h), which would be typical for towing smart pigs through a pipeline, then a typical dead band would be 3¾ mph to 4¼ mph (i.e. plus or minus 114 mph). The desired speed and deadband may be set by the velocity select switches 90.

Thus, the signals that are indicative of the pig speed are compared in the comparator and control circuit 91 with the preset speed, and if they differ from the preset speed by a predetermined amount (e.g. more than ¼ mph), a control signal is sent to the stepper motor controller 92, which in turn regulates the amount by which the first bonnet 77 is rotated and thus variably aligns the openings in the bonnets. The required movement of the stepper motor 58 for a given speed variation may be readily determined.

The odometer wheel 12 and velocity encoder 14 measure the actual speed of the pig 2 and the signals created by them, as with the output from the counter timer 89, are indicative of this speed. The drive means (ie. bonnet drive assembly 56) and control means (i.e. speed controller 43) variably control the blockage of the annulus 48 in the pig in response to the measurement of the pig speed. The collective effective cross-sectional area of the annulus 48 blockage is increased when the actual speed is lower than the desired speed by more than the preset amount, thus allowing less pipeline fluid to egress from the pig and decreased when the actual speed is higher than the desired speed by a preset amount, thus allowing more fluid to egress from the pig.

As illustrated by the first embodiment, the present invention provides for side porting (i.e. the expulsion of pipeline fluids from the pig housing in a direction which is sideways or radial in relation to the pig housing) instead of or in addition to the more traditional front porting (i.e. the expulsion of pipeline fluids through the front of the pig housing). The advantages of side porting are explained below.

Other structures are possible for varying the bypass of pipeline fluids. For example, transducers may be mounted on the control module such that upstream and downstream pressure signals are generated which signals can then be used to vary the pig's speed and the level of pipeline fluid bypass.

FIGS. 2, 8A, 8B, 9 and 17 illustrate a second embodiment of the invention which differs from the first embodiment in the following respects. The first bonnet 119 has a cylindrical portion, open at both ends, with a truncated conical portion extending from the cylindrical portion. The first bonnet 119 has a plurality of first radial openings 120 disposed around the conical portion of the first bonnet and a plurality of first circumferential openings 121 disposed around the curved surface of the cylindrical portion of the first bonnet. The second bonnet 122 is of similar shape to the first bonnet and fits substantially snugly about the first bonnet. The second bonnet 122 has a plurality of second radial openings 124 disposed around the conical portion of the second bonnet and a plurality of second circumferential openings 123 disposed around the curved surface of the cylindrical portion of the second bonnet. A nose cone 125 is mounted on the second bonnet so as to protect the pig from damage due to pipeline obstructions.

FIGS. 3, 10A, 10B, 11 and 18 depict a third embodiment of the invention which differs from the first embodiment in the following respects. A first bonnet 126 of generally cylindrical shape, open at one end, is rotationally mounted on a shaft 66 projecting beyond the front end of the housing. The first bonnet has first radial openings 127 disposed around its flat surface and first circumferential openings 128 disposed around its curved surface. A second bonnet 129 is mounted on the front end of the housing. The second bonnet has a cylindrical portion, open at both ends, and a truncated conical portion extending from the cylindrical portion. The second bonnet has second radial openings 131 disposed around its conical portion and second circumferential openings 130 disposed around the curved surface of its cylindrical portion. A manifold bonnet 93 of cylindrical shape, open at one end, is mounted on the front end of the pig housing 3 and has a plurality of third radial openings 95 disposed around its flat surface and a plurality of third circumferential openings 94 disposed around its curved surface. The first bonnet's first openings 127 and 128 are alignable with the second openings 130 and 131 and with the third openings 95 and 94 by rotation of the first bonnet relative to the second bonnet and relative to the manifold bonnet. For example, the first bonnet 126 can be rotated from a position in which the first openings 127 and 128, second openings 130 and 131, and third openings 95 and 94 are completely aligned, thereby maximizing the flow of pipeline fluids through the pig housing, to a position in which essentially none of these openings are aligned, thereby blocking the flow of pipeline fluids out of the housing. The amount of blockage of the flow of pipeline fluids through these openings and hence out of the housing is varied according to the desired speed of the pig.

FIGS. 4, 12A, 12B, 13 and 19 depict a fourth embodiment of the invention which differs from the first embodiment in the following respects. A nose cone 85, having front openings 86, is secured by a plurality of bolts 96 to the front end of a forward housing module 97. The forward housing module 97 is a hollow cylinder which is open at both ends. A first bonnet 133, in the shape of a cylinder which is open at one end, fits within a second bonnet 136 of similar shape. The second bonnet is secured to the back end of the forward housing module 97 by a plurality of bolts 101. The first bonnet 133 has a plurality of first radial openings 134 disposed around its flat surface and a plurality of first circumferential openings 135 disposed around its curved surface. The second bonnet 136 has a plurality of second radial openings 138 disposed around its flat surface and a plurality of second circumferential openings 137 disposed around its curved surface. The first bonnet is rotationally mounted on a shaft 66 extending from a central housing module 103. The second bonnet 136 is mounted by a plurality of bolts 106 to the central housing module 103.

The central housing module 103 contains the control means for operating the pig and, as with the other embodiments, the shaft may be mounted on a control module 139, in this case located in the interior of the central housing module. The control module 139 is supported within the central housing module 103 by forward support plate 105 and rearward support plate 108. Forward and rearward support plates 105 and 108 contain radially disposed openings 107 and 111 respectively that are in fluid connection with annulus 48. A third bonnet 112 is fixedly mounted to the back end of the central housing module by a plurality of bolts 109 or by other conventional means. The third bonnet is of generally cylindrical shape and is open at its back end. The third bonnet has a plurality of third radial openings 114 disposed around its flat surface and a plurality of third circumferential openings 113 disposed around its curved surface. The control module 139 is secured to the flat surface of the third bonnet via the rear cap assembly attachment ring 34 by a plurality of bolts 110. A frame 116 is mounted to the back end of the third bonnet to support both an odometer wheel assembly 7 and a rear bumper 11.

Forward annular seal 5 is secured by a plurality of bolts 96 between a flange on the nose cone 85 and a forward annular seal flange 53 on the forward housing module 97. Medial annular seal 99 is secured by a plurality of bolts 101 between a medial annular seal flange 100 on the forward housing module 97 and a flange on the second bonnet. Rearward annular seal 6 is secured by a plurality of bolts 117 between a rearward annular seal flange 50 on the third bonnet 112 and a flange on the frame 116. These annular seals seal the annulus between the pipeline and the pig housing. In operation, the pipeline fluids enter the pig through the third bonnet 112 and flow into the interior 115 of the third bonnet. From there, the pipeline fluids may exit the third bonnet through the third radial openings 114 (in which case they will pass into an internal annulus 104 between the central housing module and the control module located within the central housing module) and through the third circumferential openings 113 (in which case they will pass through an exterior annulus 102 between the pipeline wall and the pig housing). For the fluids which travel through the exterior annulus, the medial annular seal 99 mounted near the back end of the forward housing module will prevent the fluids from travelling any further forward through this annulus.

Through rotation of the first bonnet, the first and second openings may be selectively aligned so as to permit the desired quantity of flow of pipeline fluids into the forward housing module. In the case of the fluids which have passed through the third radial openings 114 into the interior annulus 104, these fluids may pass through the first and second radial openings to the extent that these openings are aligned by virtue of the rotation of the first bonnet relative to the second bonnet. In the case of the fluids which have passed through the third circumferential openings 113 into the exterior annulus, these fluids may pass through the first and second circumferential openings to the extent that these openings are aligned by rotation of the first bonnet relative to the second bonnet. From that point on, the fluids are then free to pass through the interior 98 of the forward housing module 97, through the openings 86 in the nose cone 85 and hence out of the pig. In this manner, the speed of the pig can thus be selectively controlled.

FIGS. 5, 14A, 14B, 15 and 20 depict a fifth embodiment of this invention. This embodiment is similar to the fourth embodiment with the exception that there are no radial openings in the first bonnet 140 and second bonnet 142. As a result, the flow of pipeline fluids is now through the circumferential openings in the third bonnet, through the exterior annulus, through the aligned first circumferential openings 141 and second circumferential openings 143, through the forward housing module and through the openings in the nose cone. The speed of the pig, can therefore be controlled by varying the degree of alignment between the first and second circumferential openings.

Other variations of the illustrated embodiments are possible without departing from the spirit of the present invention. For example, in the fourth and fifth embodiments, the third bonnet 112 may be elimated together with rearward annular seal 6, rearward annular seal flange 50 and the associated mounting bolts 117. The frame 116 may be mounted directly to rearward support plate 108, at the back end of central housing module and to control module housing 139. A plurality of wheels may be mounted to the frame 116 so as to bear against the pipeline wall while, at the same time, permitting the flow of pipeline fluids into interior annulus 104 and exterior annulus 102 in the case of the fourth embodiment and interior annulus 104 in the case of the fifth embodiments.

Another minor variation which falls within the scope of this invention involves the mounting of the bonnets at the rear of the housing rather than at the front of the housing so as to regulate the speed of the pig by controlling the flow of pipeline fluids into the pig housing. Also, rather than one of the bonnets being fixedly mounted on the pig housing, both of the bonnets could be mounted such that they are free to controllably rotate about a common axis. It also is not essential that the first bonnet rotate while the second bonnet is mounted on the housing; the invention would also work if the first bonnet were fixedly mounted on the housing and the second bonnet was rotationally mounted such that it was free to rotate about an axis parallel to the longitudinal axis of the housing. Furthermore, the openings in the bonnets could be aligned by means other than the rotation of one or more of the bonnets. For example, one of the bonnets could move axially such that the bonnets would effectively act as a valve which may be opened or shut to, alternatively, permit or restrict the exit of pipeline fluids from the pig housing. Although the bonnets described and illustrated herein are of particular shapes, a variety of other shapes are also possible provided that they can be arranged such that they block the flow of pipeline fluids out of the housing except through openings in the bonnets. Furthermore, the side porting of the present invention is so advantageous in controlling the speed of a pig that one could eliminate the radial openings in the bonnets entirely and use just the circumferential openings in the bonnets without departing from the essence of the invention.

The pig of the present invention may be used in a variety of ways. For example, it may be used by itself as a cleaning tool in multi or single-phase pipelines. The provision of side porting in the present invention lends itself particularly well to the operation of a pig as a cleaning tool in that the expulsion of pipeline fluid radially from the pig housing towards the pipeline wall has the effect of scouring or wiping congealed liquids or solids from the pipeline wall. In this manner, the pig of the present invention may significantly reduce the likelihood of slug formation in a pipeline. Also, the pig of the present invention can be used to tow other tools or pigs, or it can be incorporated into a pipeline tool which provides other inspection services.

The present invention is advantageous over the earlier Campbell and Krieg patents and over the other prior art in that it is of relatively simple, sturdy construction and permits a greater bypass of pipeline fluids through the pig housing so as to permit a broader range of speed of the pig. Instead of using the flat discs of the prior art for the purposes of porting, the present invention uses bonnets which have a depth dimension. As such, the bonnets can be oriented such that both the frontal openings in the bonnets and the openings along their depth dimension can be selectively aligned. This provision of side porting greatly enhances the ability to control the speed of the pig as it travels through the pipeline. Side porting is able to achieve this advantage because it increases the total available surface area through which pipeline fluids may be expelled. For example, if it is desired to increase the degree of side porting which may be achieved, bonnets with a greater depth dimension may be used so as to increase the available surface area through which pipeline fluids may be expelled when the circumferential openings in the bonnets are fully aligned.

Other changes and modifications to the described embodiments may be made without departing from the scope or spirit of the invention. The scope of the invention is intended to be limited solely by the scope of the appended claims.

What is claimed is:

1. An apparatus for use in a pipeline (1), the pipeline (1) having an interior surface in contact with the apparatus, the apparatus being propelled within the pipeline (1) by pipeline fluids flowing therein, the apparatus comprising:

a housing (3) having a front end, a back end, a vertical axis, a longitudinal axis, an entry opening adjacent the back end through which pipeline fluids may enter the housing (3) and an exit opening adjacent the front end through which pipeline fluids may exit the housing (3), the exit opening being in fluid communication with the entry opening;

means disposed peripherally of the housing (3) for sealing engagement of the housing (3) with the interior surface of the pipeline (1);

at least two bonnets (77, 82) having openings, the at least two bonnets (77, 82) extending from the front end of the housing (3);

wherein at least one of the bonnets (77) is movable in relation to another of the at least two bonnets (82); and means for variably aligning the openings (78, 79, 83, 84) in the bonnets (77, 82) so as to permit the exit of pipeline fluids through the exit opening, through the aligned openings and from the housing (3) at an acute angle to the vertical axis.

2. The apparatus of claim 1, wherein the acute angle is less than 45° from the vertical axis.

3. The apparatus of claim 1 or claim 2, further comprising:

a shaft (66) extending from the housing (3) and oriented parallel to the longitudinal axis;

one of the at least two bonnets (77) being mounted on the shaft (66).

4. The apparatus of claim 1, wherein the at least two bonnets (77, 82) comprise:

a first bonnet (77) of generally cylindrical shape, open at one end, having a plurality of first circumferential openings (79) disposed around its curved surface and a second bonnet (82) having a curved surface for closely fitting about the curved surface of the first bonnet (77), the second bonnet (82) having a plurality of second circumferential openings (83) disposed around its curved surface.

5. The apparatus of claim 4, wherein:

the first bonnet (77) also has a plurality of first radial openings (78) disposed around a flat surface; and the second bonnet (82), also has a plurality of second radial openings (84) disposed around a flat surface.

6. The apparatus of any of claims 1, 2, 4, or 5 wherein the means for aligning the openings in the bonnets (77, 82) comprise:

sensor means for producing first signals indicative of the speed of the apparatus;

control means responsive to the first signals to produce control signals;

drive means responsive to the control signals;

at least one of the bonnets (77) being movable by the drive means in relation to the other bonnet (82) so as to vary the degree of alignment between the first openings (78, 79) and the second openings (83, 84).

7. The apparatus of claim 6, wherein the drive means, a power supply and the control means are disposed in a control module (4) located within the housing (3).

8. The apparatus of claim 1 further comprising:

a manifold bonnet (93) of cylindrical shape, open at one end, extending from the front end of the housing (3), the manifold bonnet (93) having a plurality of third circumferential openings (94) disposed around its curved surface.

9. The apparatus of claim 8, further comprising, said manifold bonnet (93) additionaly having a plurality of third radial openings (95) disposed around a flat surface.

10. The apparatus of claim 1, wherein the at least two bonnets comprise:

a first bonnet (119) having a cylindrical portion, open at both ends, and a truncated conical portion extending from the cylindrical portion, the first bonnet having a plurality of first circumferential openings (121) disposed around the curved surface of its cylindrical portion, a second bonnet (122) having a cylindrical portion, open at both ends, and a truncated conical portion extending from the cylindrical portion, the second bonnet (122) having a plurality of second circumferential openings (123) disposed around the curved surface of its cylindrical portion;

one of the first and second bonnets (119, 122) being mounted so that it fits about the other of the first and second bonnets (119, 122).

11. The apparatus of claim 10, wherein:

the first bonnet (119) also has a plurality of first radial openings (120) disposed around its truncated conical portion; and the second bonnet (122) also has a plurality of second radial openings (124) disposed around its truncated conical portion.

12. An apparatus for use in a pipeline (1), the pipeline (1) having an interior surface in contact with the apparatus, the apparatus being propelled within the pipeline (1) by pipeline fluids flowing therein, the apparatus comprising:

a first housing (97) having a front end and a back end;

a second housing (103) having a front end, a back end, a longitudinal axis and a vertical axis;

means disposed peripherally of the first housing (97) for sealing a first exterior annulus between the interior surface of the pipeline (1) and the first housing (97);

means disposed peripherally of the second housing (103) for sealing a second exterior annulus between the pipeline (1) and the second housing (103);

a shaft (66) mounted to the control module (139) and extending from the front end of the second housing (103) and oriented such that it is parallel to the longitudinal axis of the second housing (103);

a first bonnet (133) of generally cylindrical shape, open at one end, mounted on the shaft (66) the first bonnet (133) having a plurality of first circumferential openings (135) disposed around its curved surface;

a second bonnet (136) of generally cylindrical shape, open at one end, mounted on the back end of the first housing (97) for fitting about the first bonnet (133), the second bonnet (136) having a plurality of second circumferential openings (137) disposed around its curved surface;

a third bonnet (112) of generally cylindrical shape, open at one end, mounted on the back end of the second housing (103), the third bonnet (112) having a plurality of third circumferential openings (113) disposed around its curved surface;

sensor means for producing first signals indicative of the speed of the apparatus;

control means responsive to the first signals to produce control signals;

drive means responsive to the control signals;

the first bonnet (133) being removable by the drive means in response to the control signals in relation to the second bonnet (136) so as to vary the degree of alignment between the first openings (135) and the second openings (137).

13. The apparatus of claim 12 wherein:

the first bonnet (133) also has first radial openings (134) disposed around its flat surface;

the second bonnet (136) also has second radial openings (138) disposed around its flat surface; and the third bonnet (112) also has third radial openings (114) disposed around its flat surface.

* * * * *